(12) United States Patent
Gao et al.

(10) Patent No.: US 11,768,267 B2
(45) Date of Patent: Sep. 26, 2023

(54) SENSOR NETWORK SYSTEM AND DEPLOYMENT FOR OBJECT DETECTION, TRACKING AND MITIGATION

(71) Applicant: AeroDefense LLC, Oceanport, NJ (US)

(72) Inventors: Ziang Gao, Morganville, NJ (US); Taylor Sinatra, Millstone Township, NJ (US); Hadi Kasasbeh, Ocean, NJ (US); Linda Ziemba, Highlands, NJ (US)

(73) Assignee: AERODEFENSE LLC, Holmdel, NJ (US)

( * ) Notice: Subject to any disclaimer, the term of this patent is extended or adjusted under 35 U.S.C. 154(b) by 55 days.

(21) Appl. No.: 17/345,790

(22) Filed: Jun. 11, 2021

(65) Prior Publication Data

US 2021/0389408 A1 Dec. 16, 2021

Related U.S. Application Data

(60) Provisional application No. 63/038,756, filed on Jun. 13, 2020.

(51) Int. Cl.
*G01S 3/02* (2006.01)
*G01S 5/02* (2010.01)
*H04W 84/18* (2009.01)

(52) U.S. Cl.
CPC ........ *G01S 5/0258* (2020.05); *G01S 5/02213* (2020.05); *H04W 84/18* (2013.01)

(58) Field of Classification Search
CPC ....... G01S 5/0258; G01S 5/02213; G01S 3/02
USPC .......................................................... 342/451
See application file for complete search history.

(56) References Cited

U.S. PATENT DOCUMENTS

| | | | |
|---|---|---|---|
| 2016/0090691 A1* | 3/2016 | Andronic | G01N 21/89 162/252 |
| 2017/0127241 A1* | 5/2017 | Sjölund | G01S 5/02213 |
| 2019/0058979 A1* | 2/2019 | Stagg | H04W 4/029 |
| 2020/0007507 A1* | 1/2020 | Zhu | H04L 12/66 |
| 2020/0205055 A1* | 6/2020 | Snodgrass | H04L 67/12 |

FOREIGN PATENT DOCUMENTS

| | | | |
|---|---|---|---|
| CN | 109445313 A | * 3/2019 | |
| DE | 102021116510 A1 | * 12/2022 | |
| EP | 2530862 A1 | * 12/2012 | H04K 3/45 |

* cited by examiner

*Primary Examiner* — Harry K Liu
(74) *Attorney, Agent, or Firm* — Gearhart Law, LLC

(57) ABSTRACT

Described herein are different distributed sensor network models, use cases, and details of the components of each model to achieve the goal of monitoring, detecting, tracking, and mitigating a target(s) such as a signal, an object, a phenomenon, etc. An independent sensor or a local sensor network may supply data to one or more fusion center(s) that collect(s) data and perform(s) higher logic to enhance system performance. A local sensor network allows independent sensors or other local sensor networks to merge into the local sensor network. A sensor cloud can be formed by multiple local sensor networks and independent sensors. By using different distribution models, the local sensor network can provide protection for various targets like Very Important Personnel (VIP) vehicles, lands, facilities, and cities.

17 Claims, 22 Drawing Sheets

Physical design of a sensor

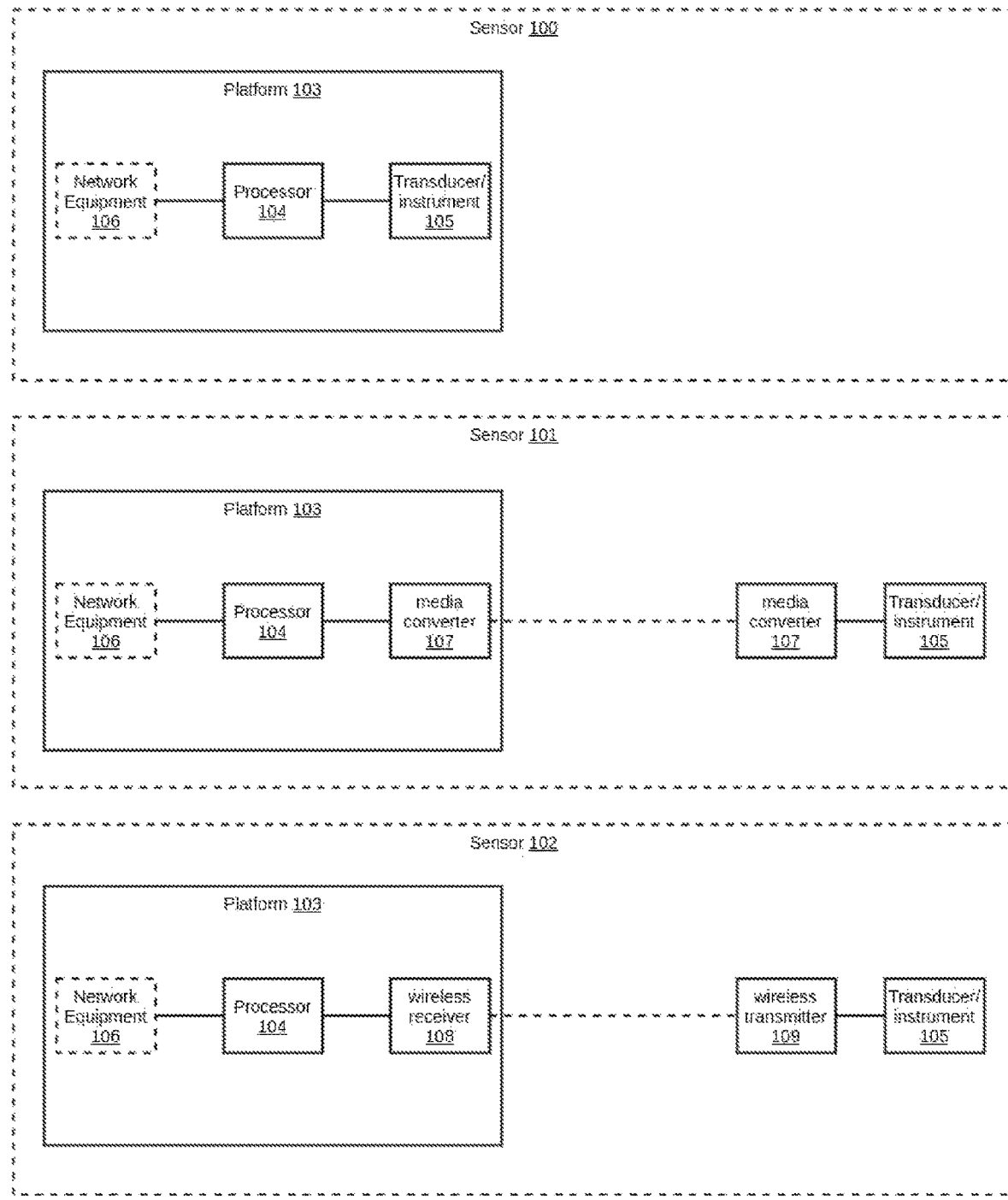
FIG. 1 Physical design of a sensor

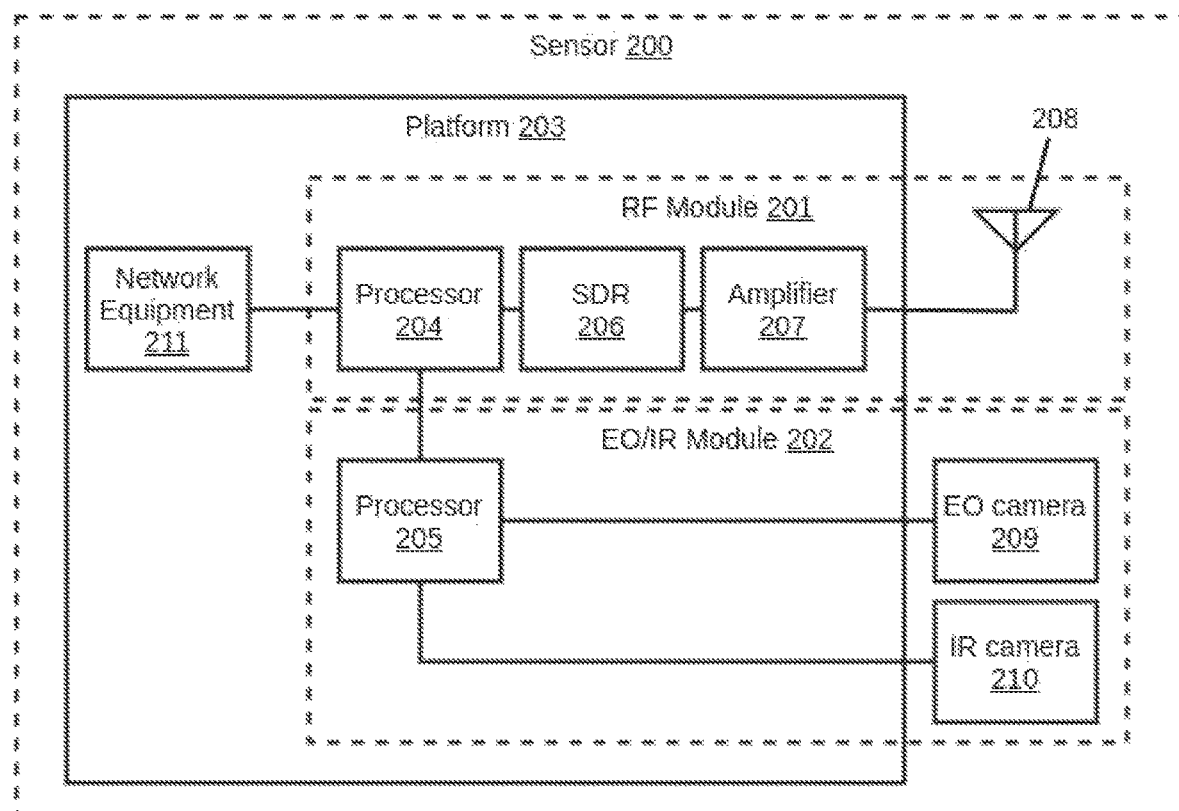
FIG. 2 Sensor module example

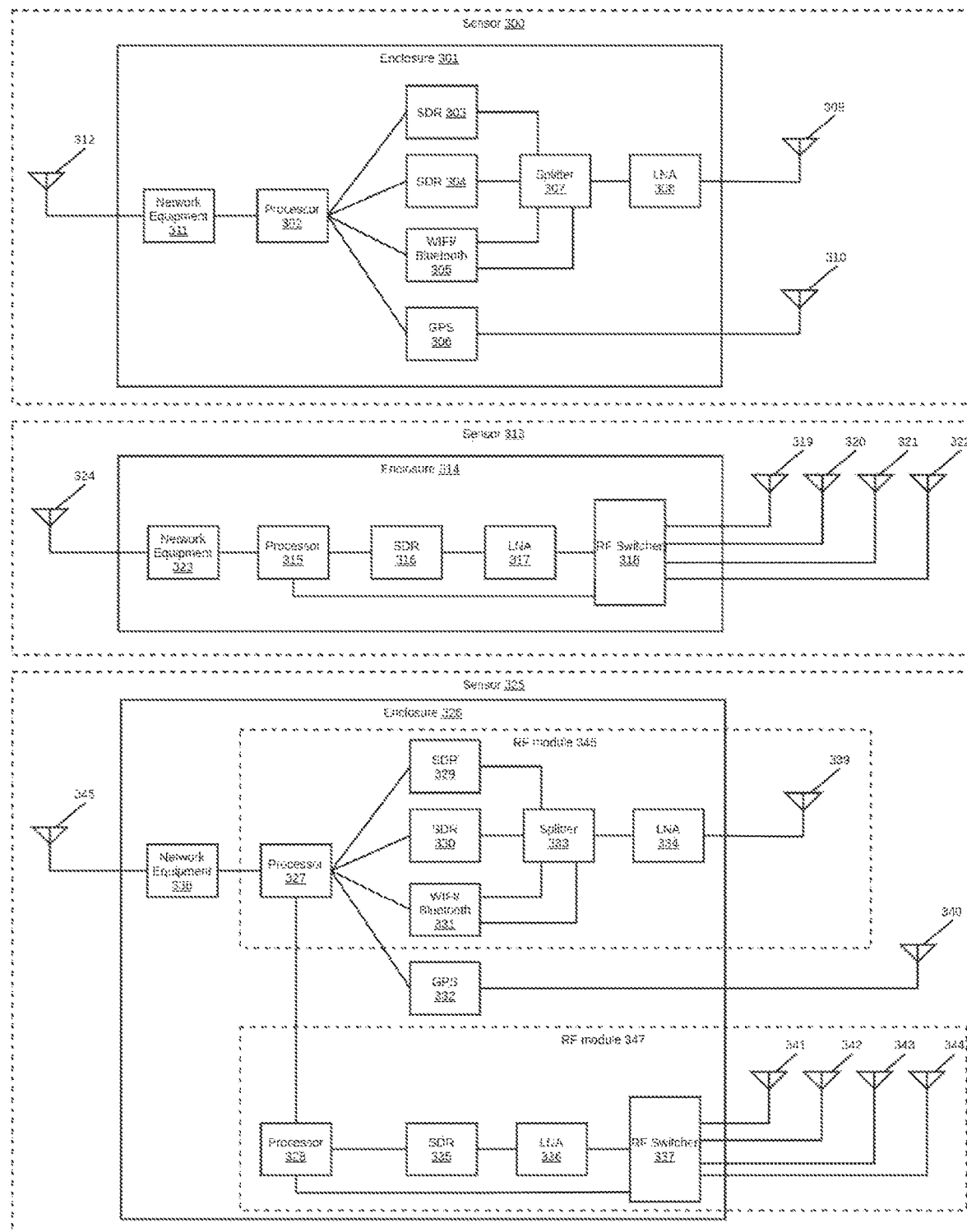
FIG. 3 Examples of preferred sensor embodiment

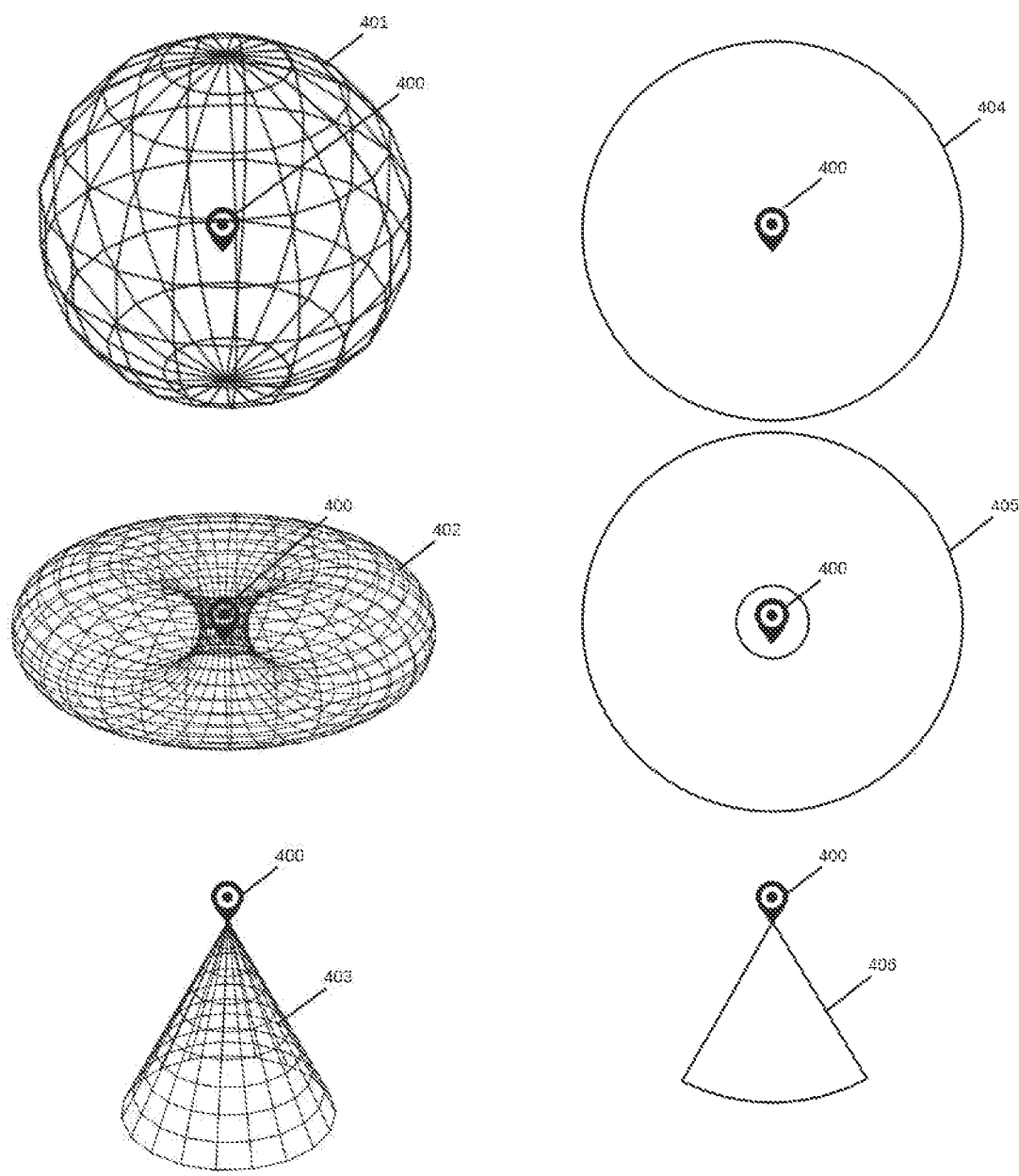
FIG. 4 Sensor monitoring zones

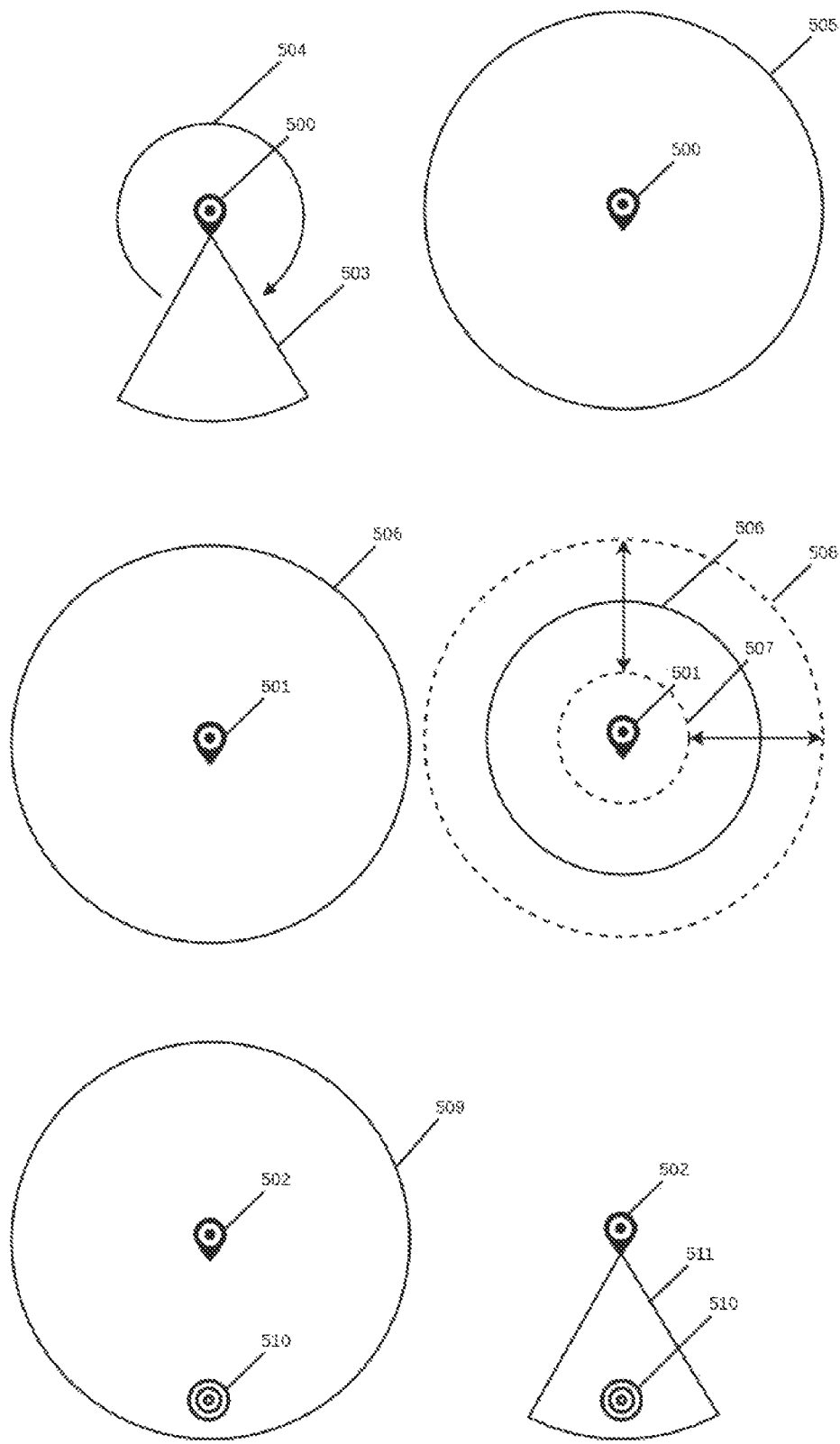
FIG. 5 Adaptive monitoring zone example

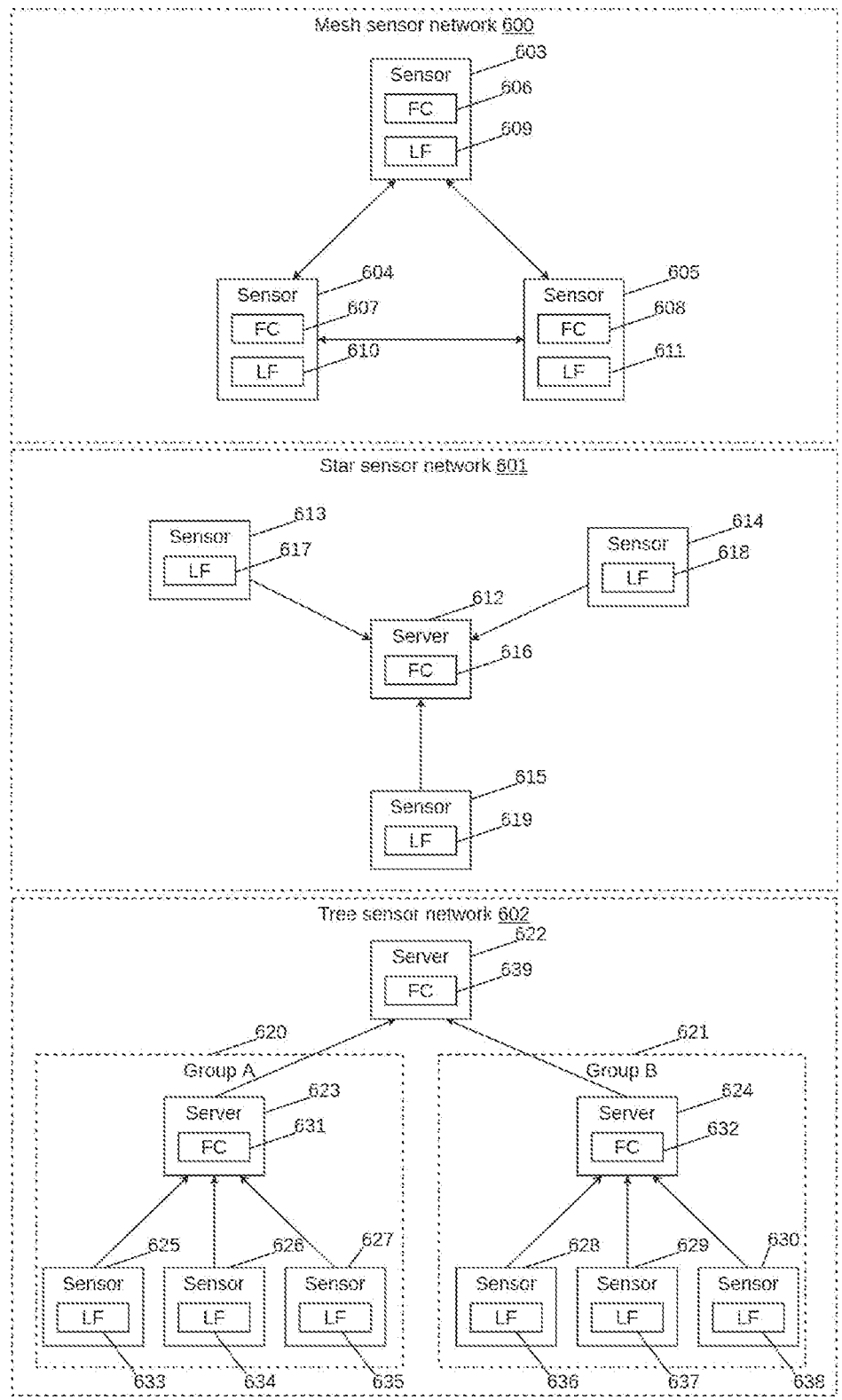
FIG. 6 Sensor network topology example

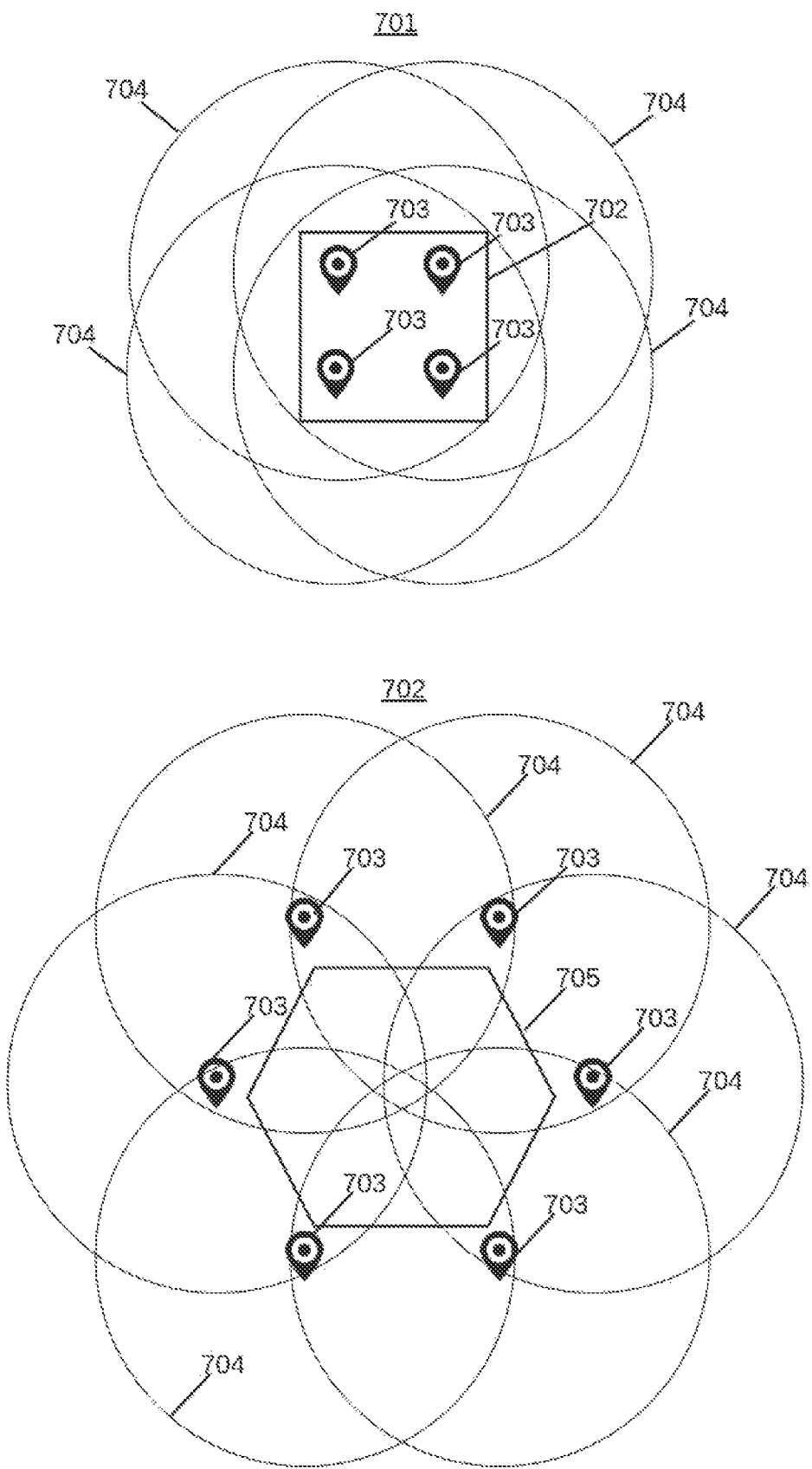
FIG. 7 Stationary sensor distribution

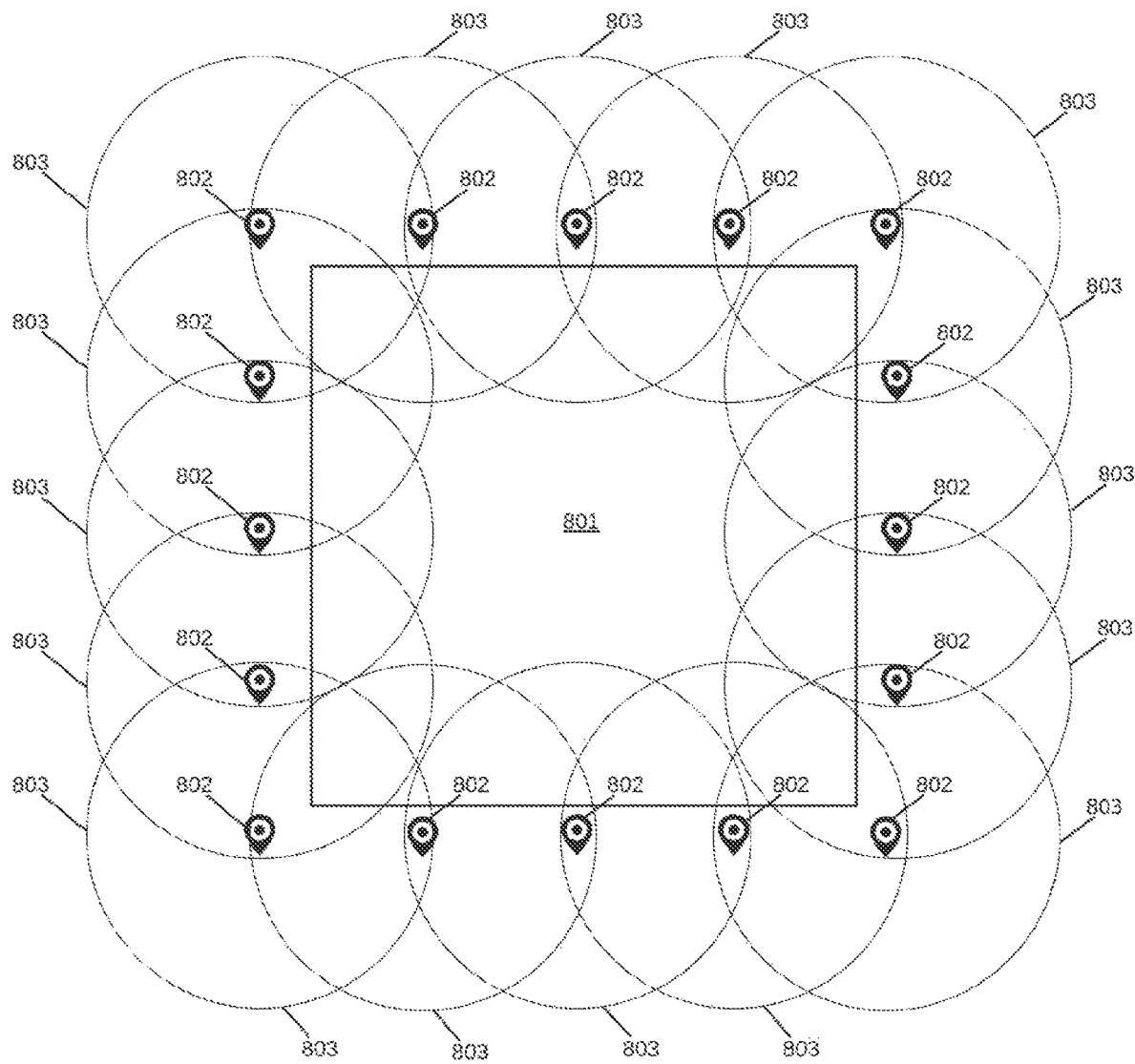
FIG. 8 Stationary sensor distribution

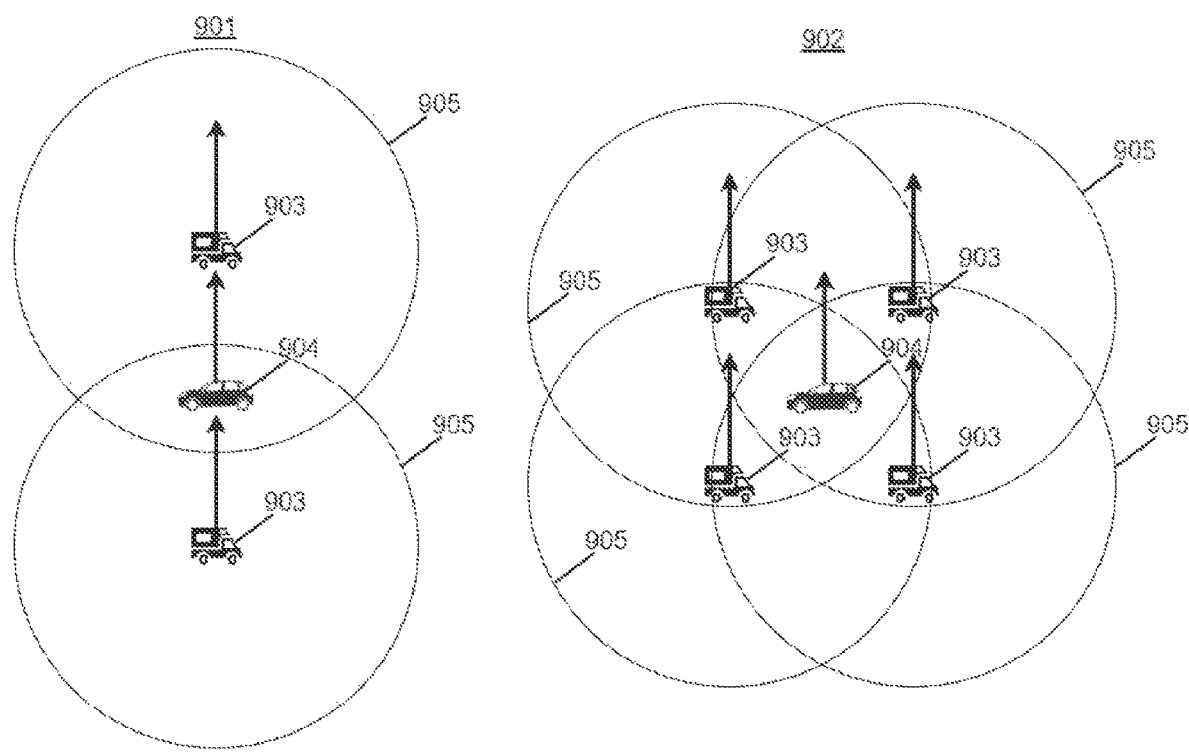
FIG. 9 Mobile sensor distribution

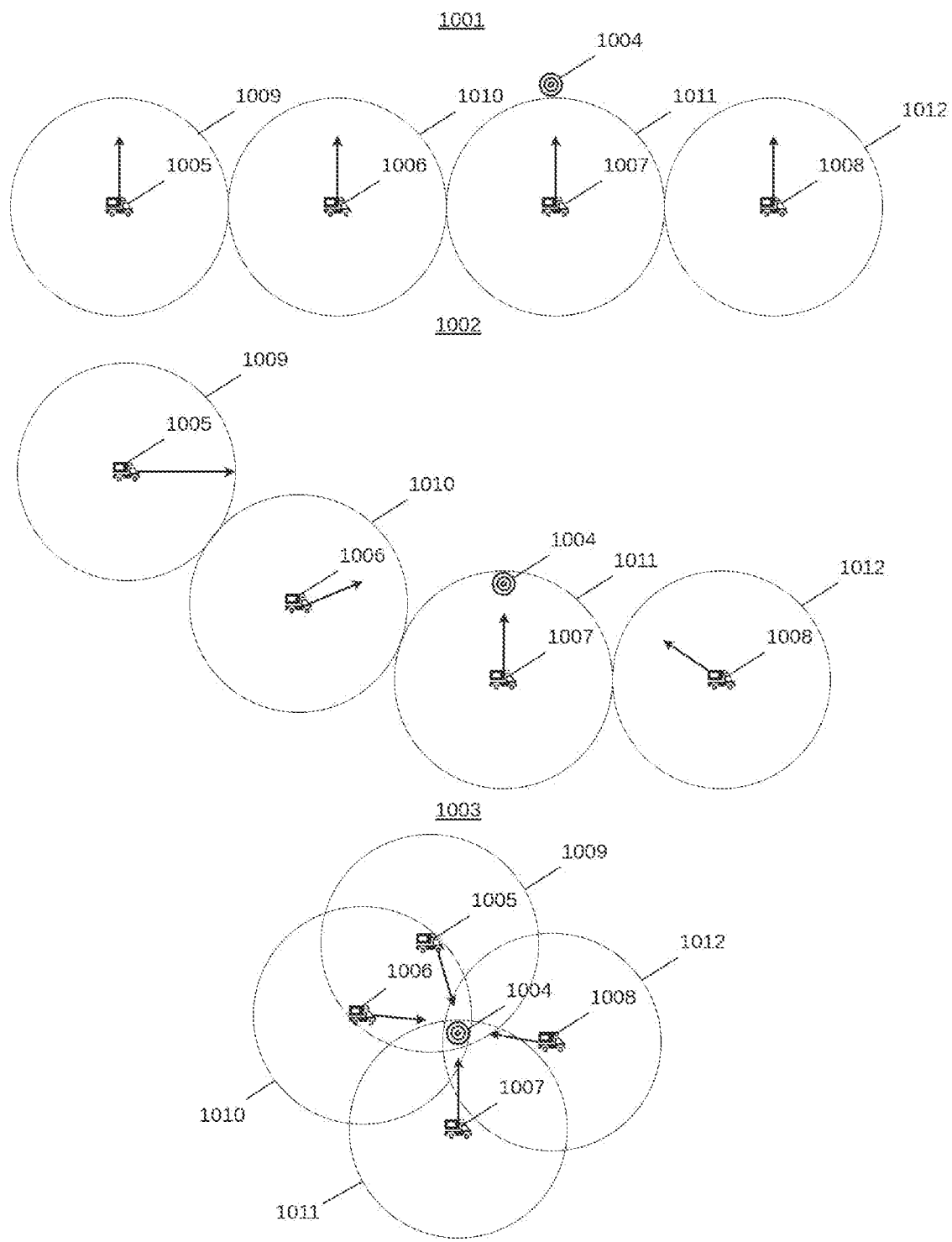
FIG. 10 Mobile sensor distribution

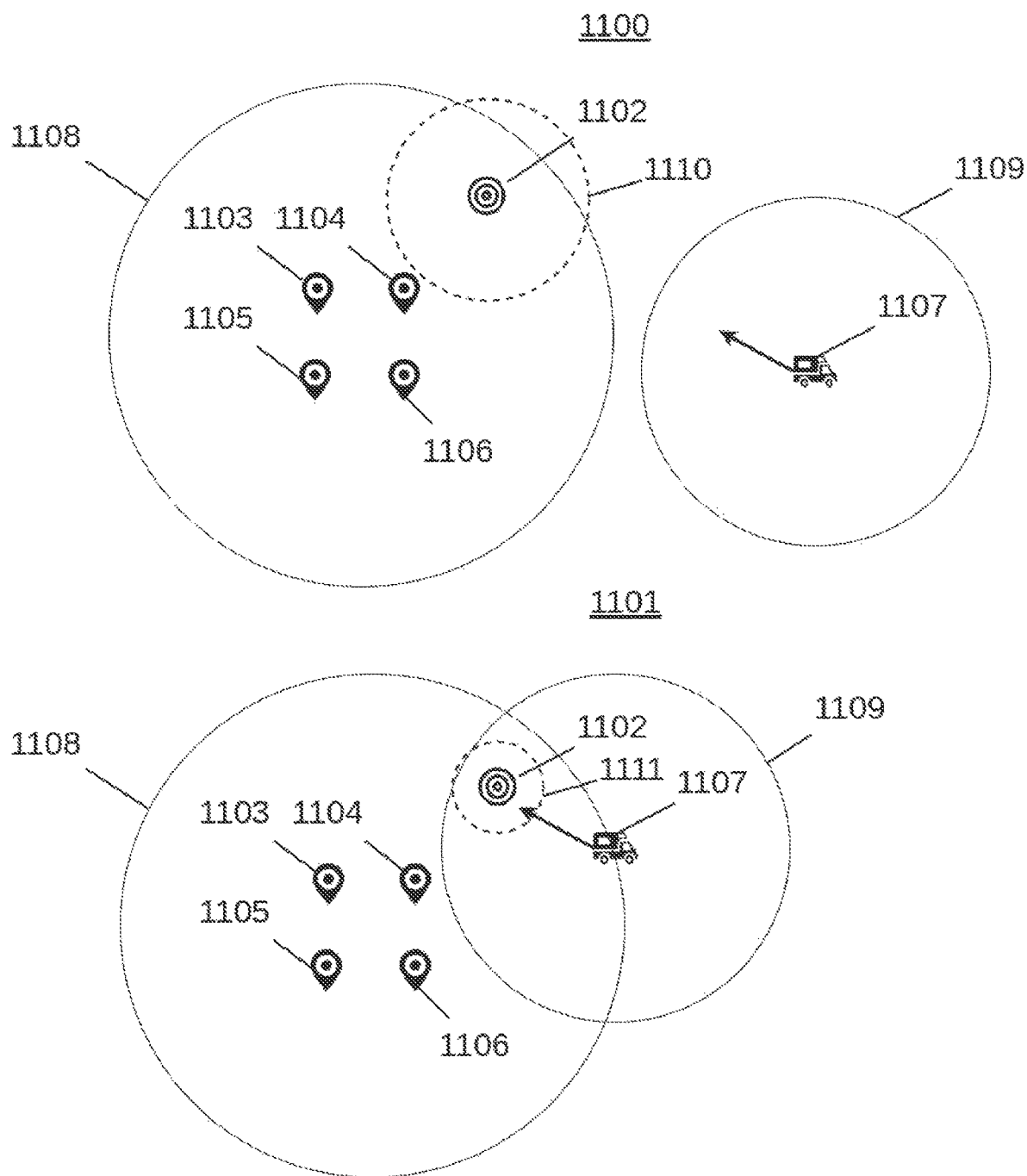
FIG. 11 Hybrid sensor distribution

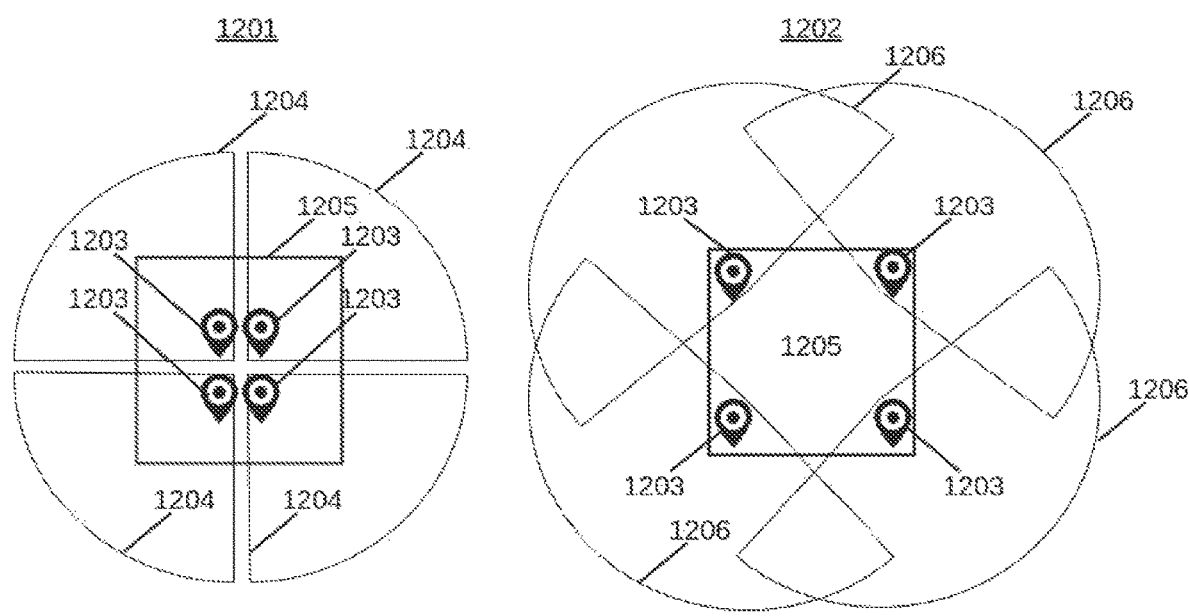
FIG. 12 Directional sensor distribution

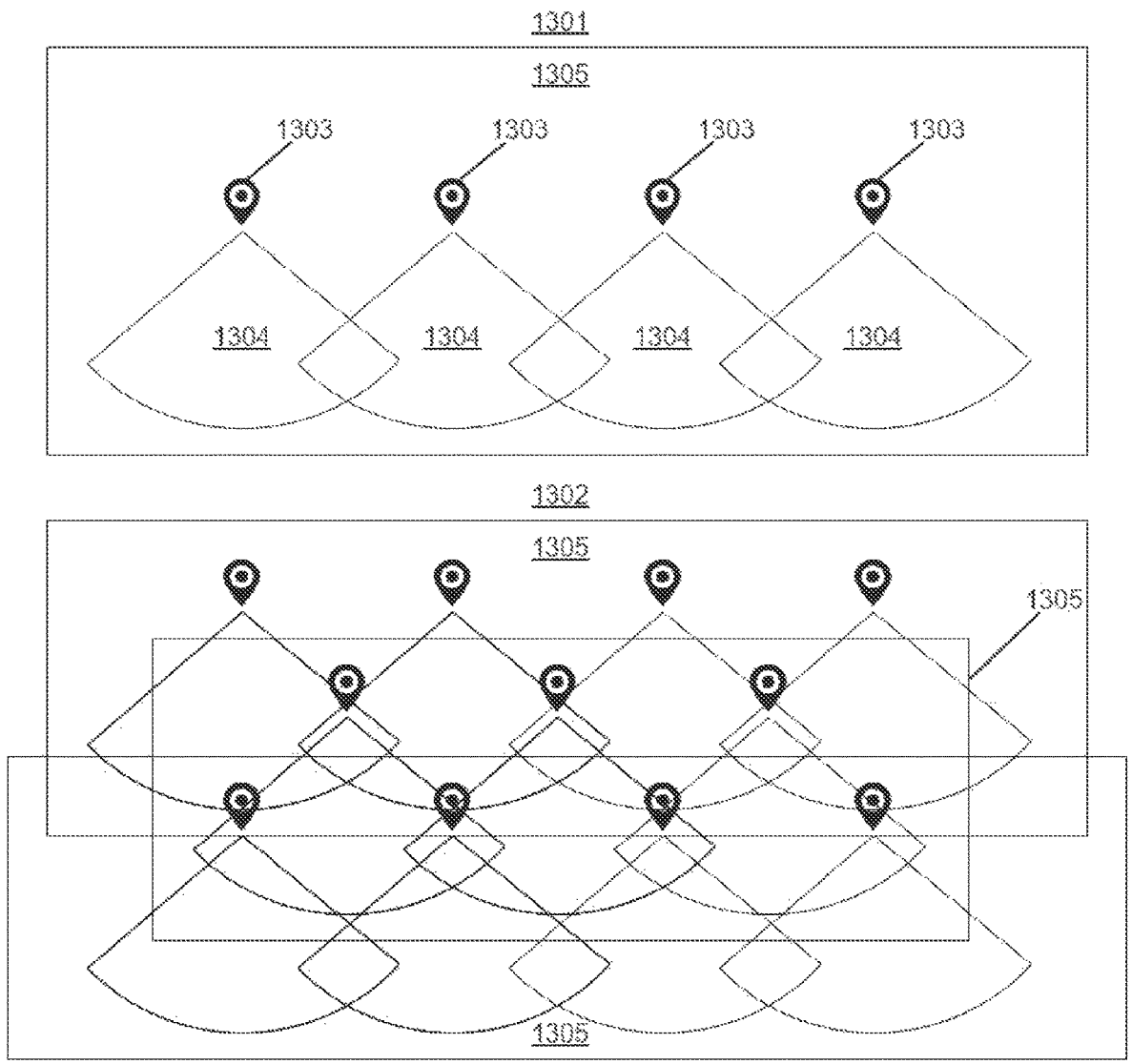
FIG. 13 Directional sensor distribution

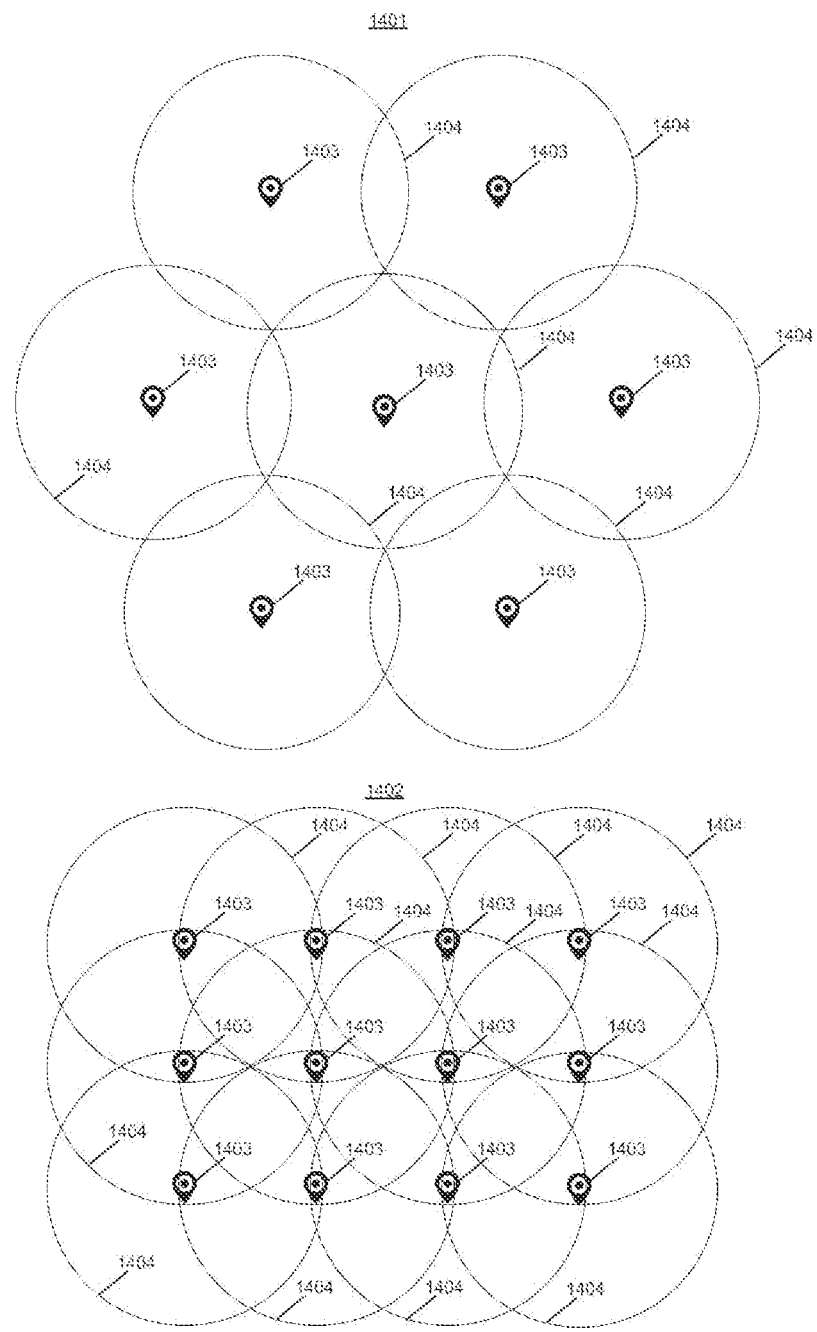
FIG. 14 Grid sensor distribution

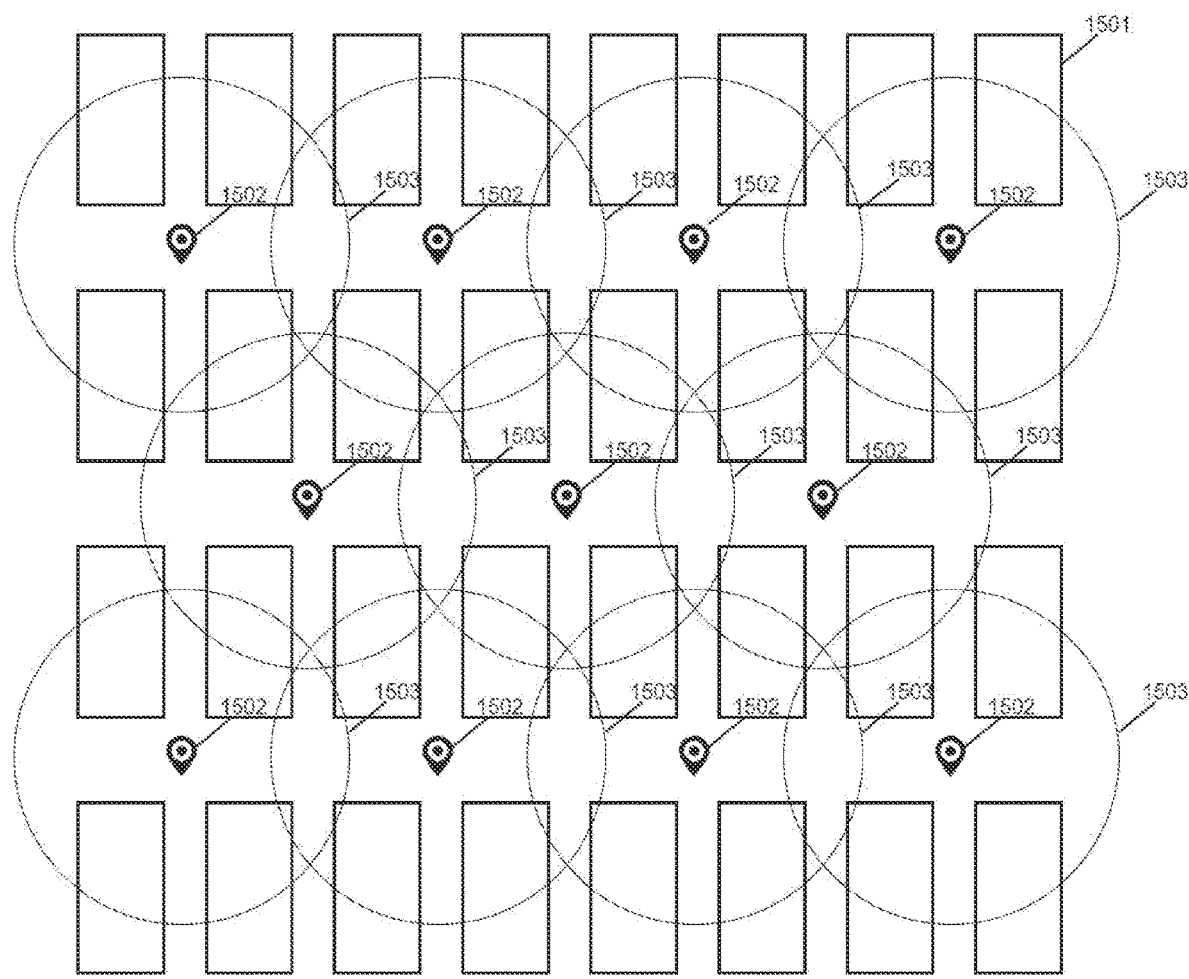
FIG. 15 Grid sensor distribution example

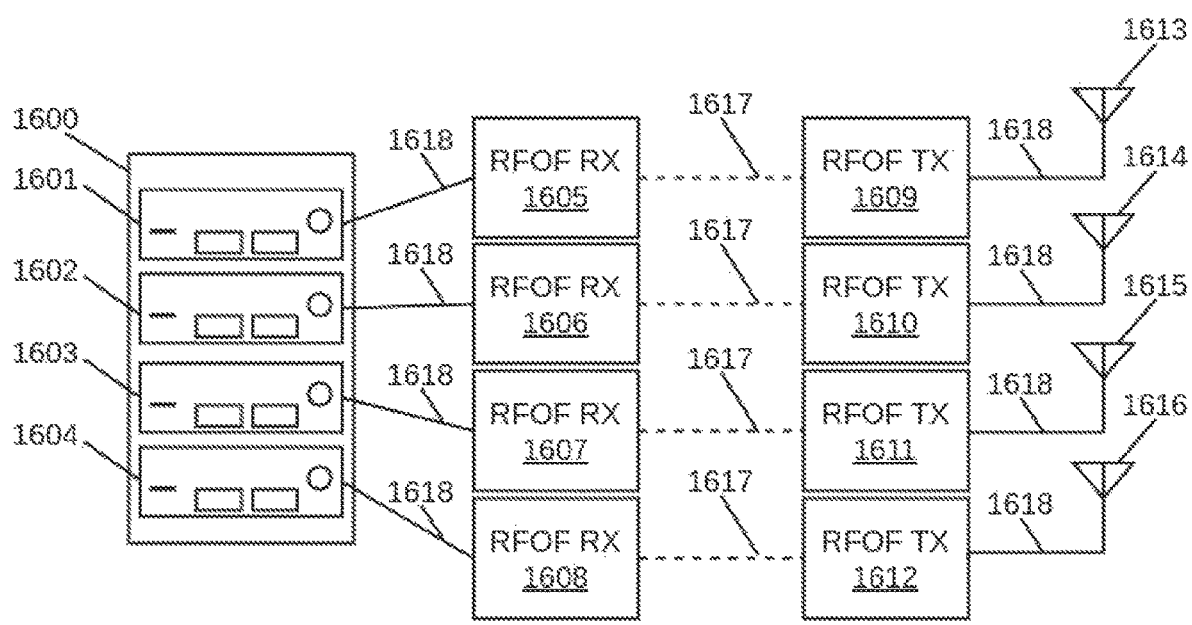
FIG. 16 Remote sensor distribution

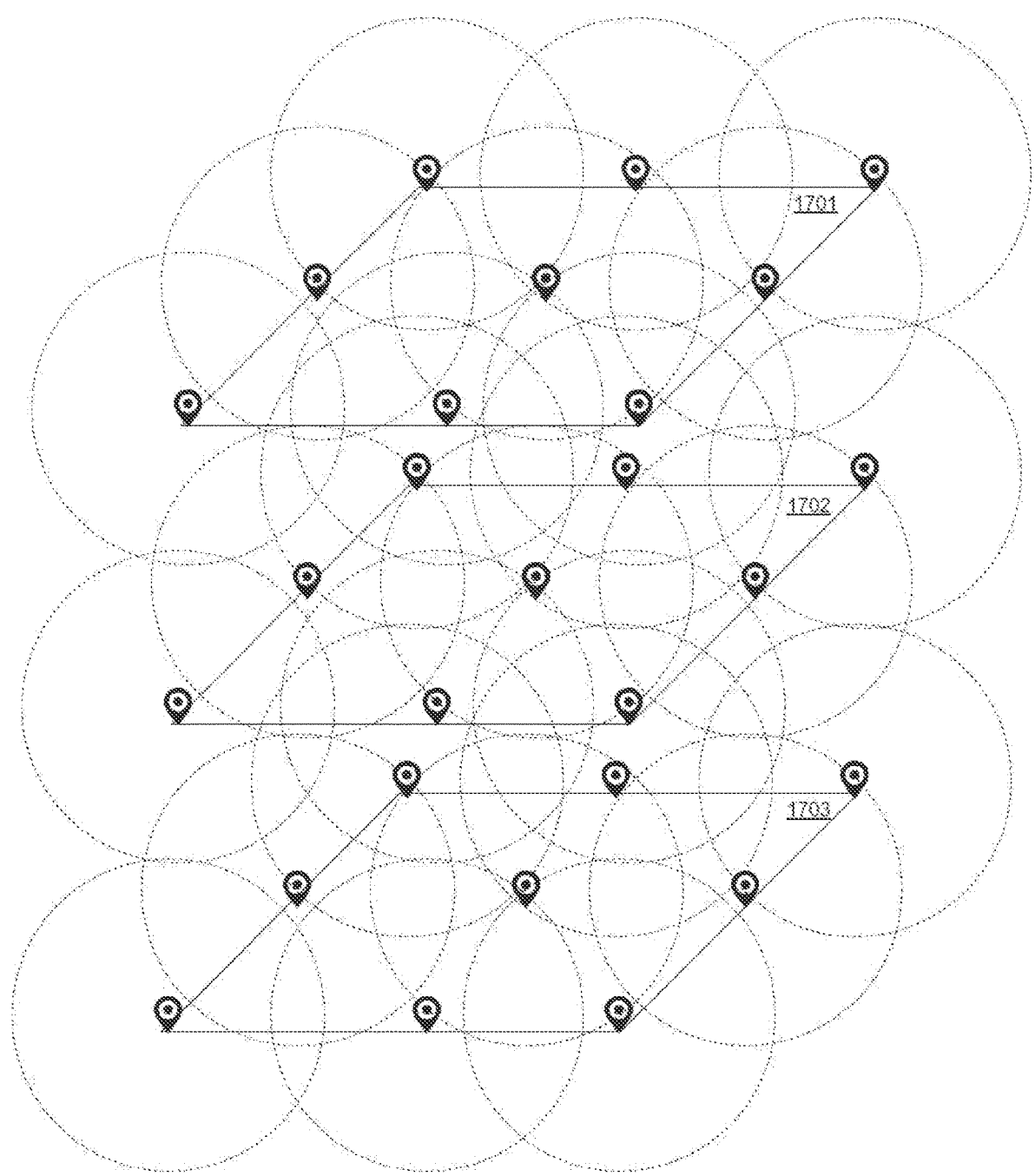
FIG. 17 3D sensor distribution

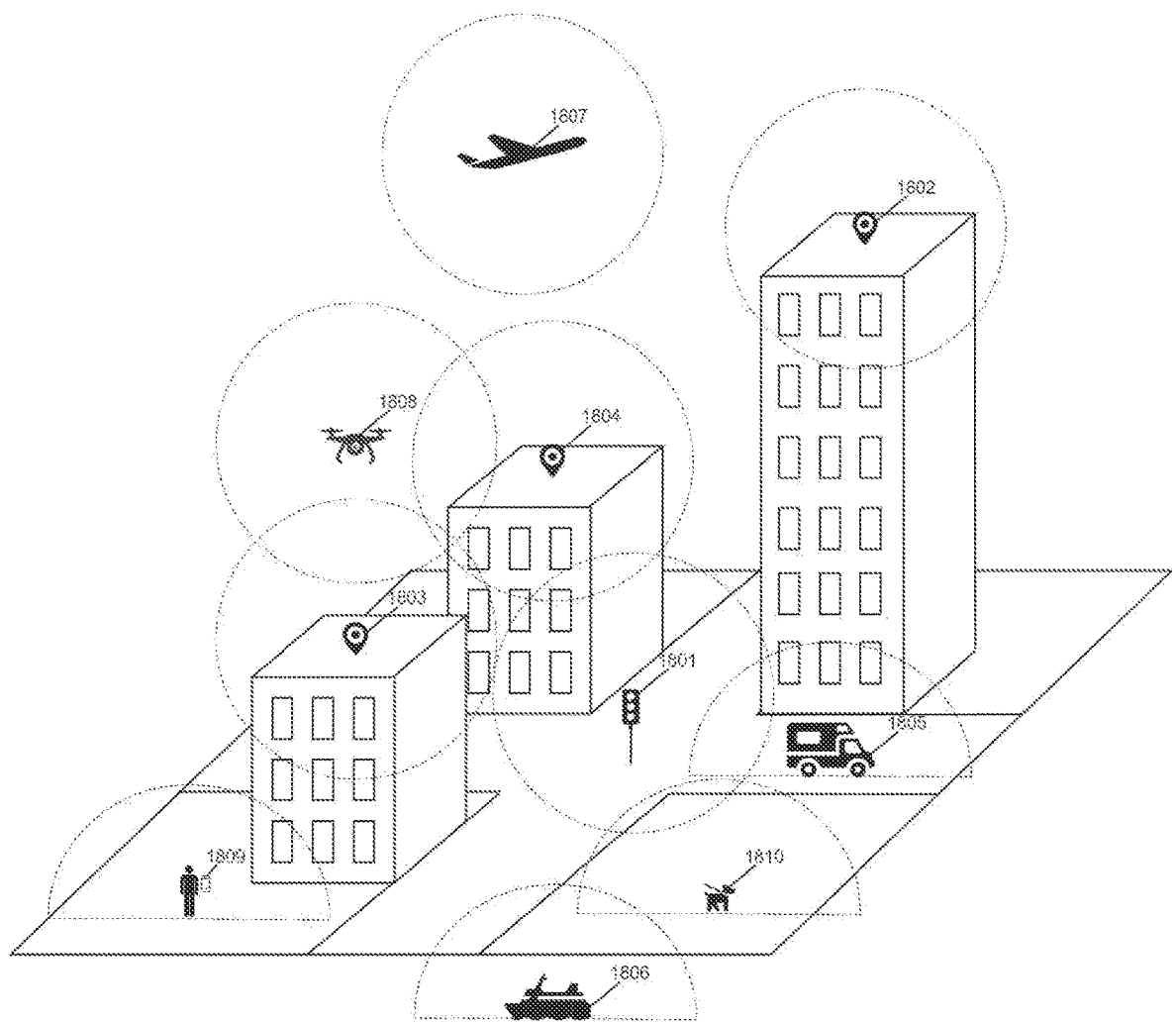
FIG. 18 3D sensor distribution

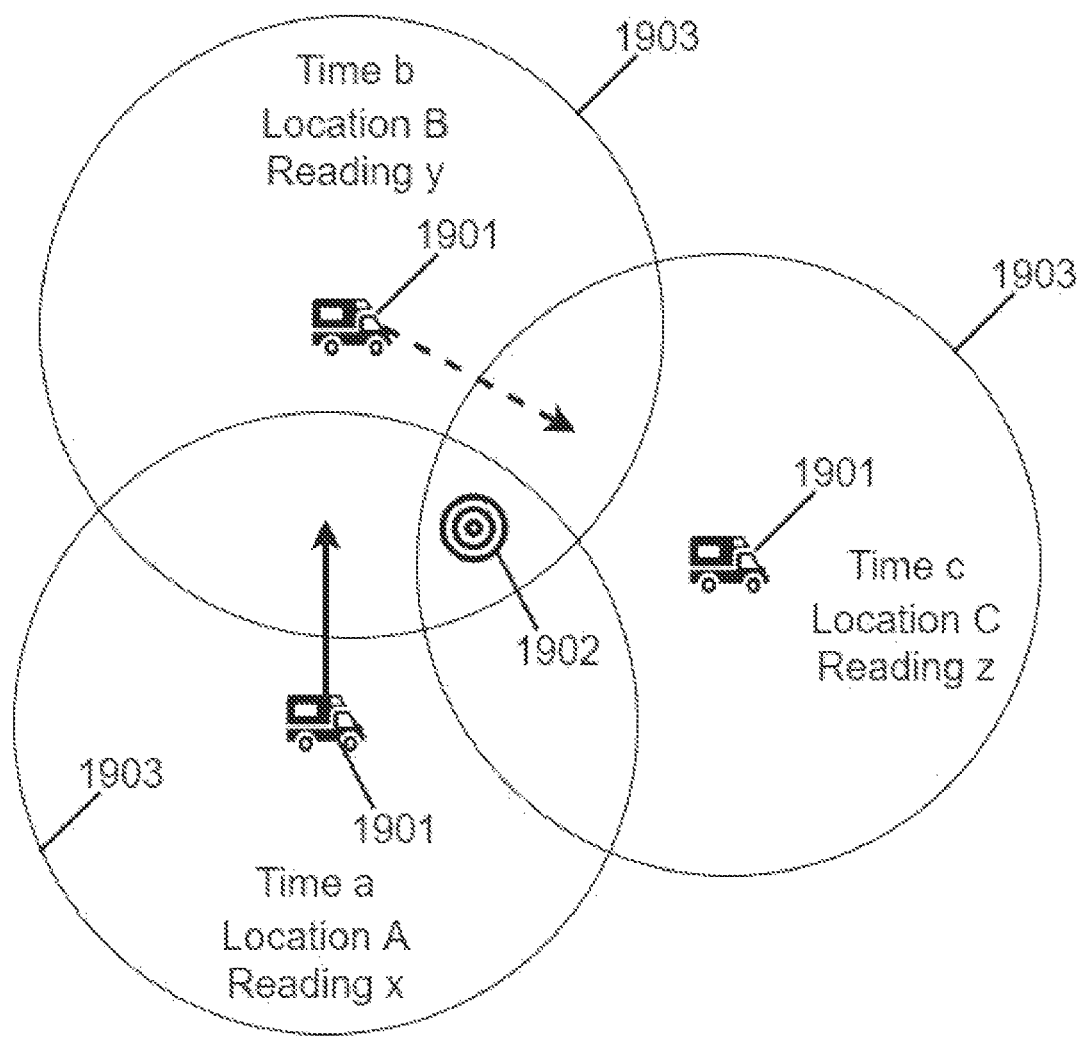
FIG. 19 Time based sensor distribution

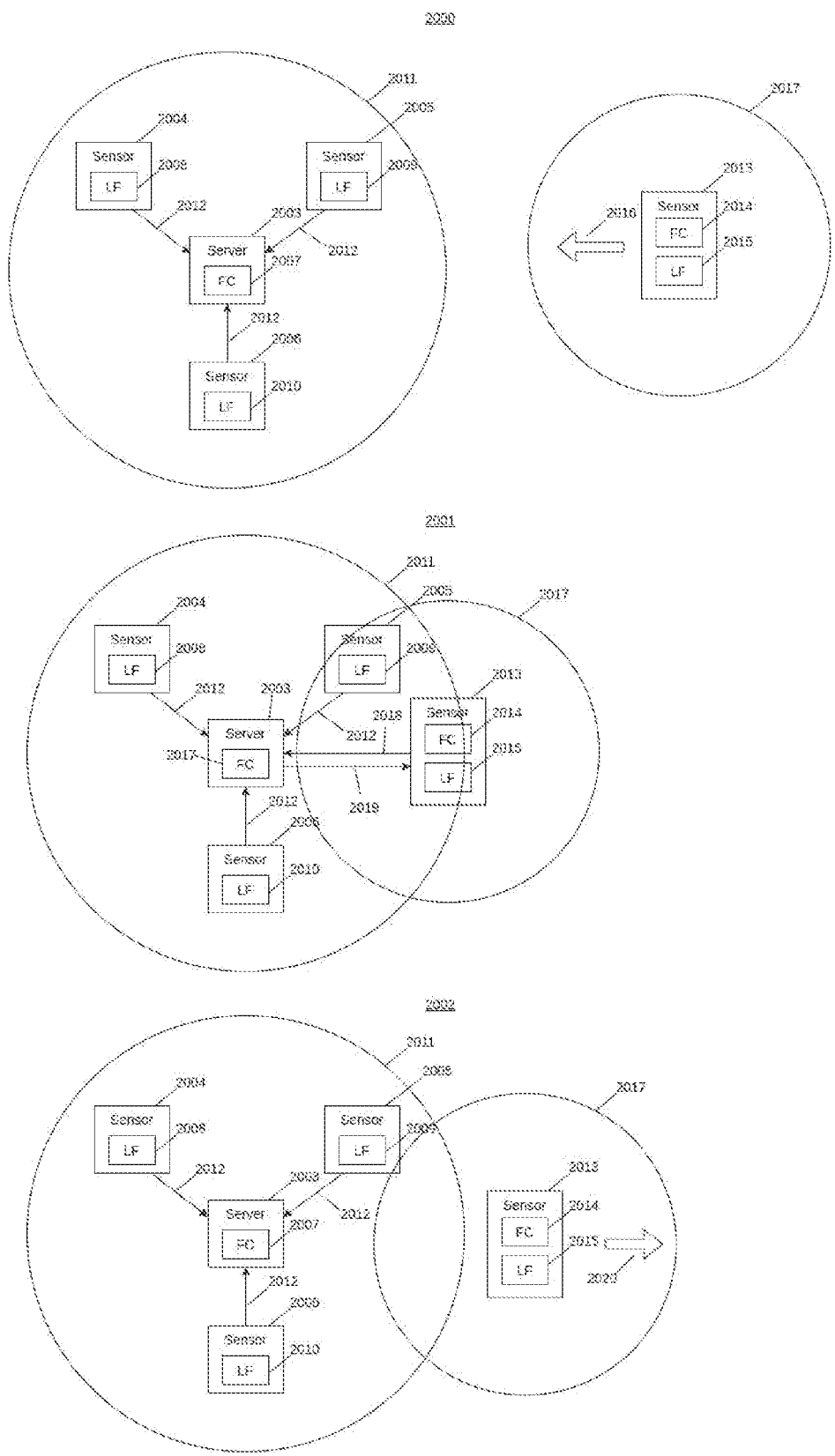
FIG. 20 Stationary sensor network extension

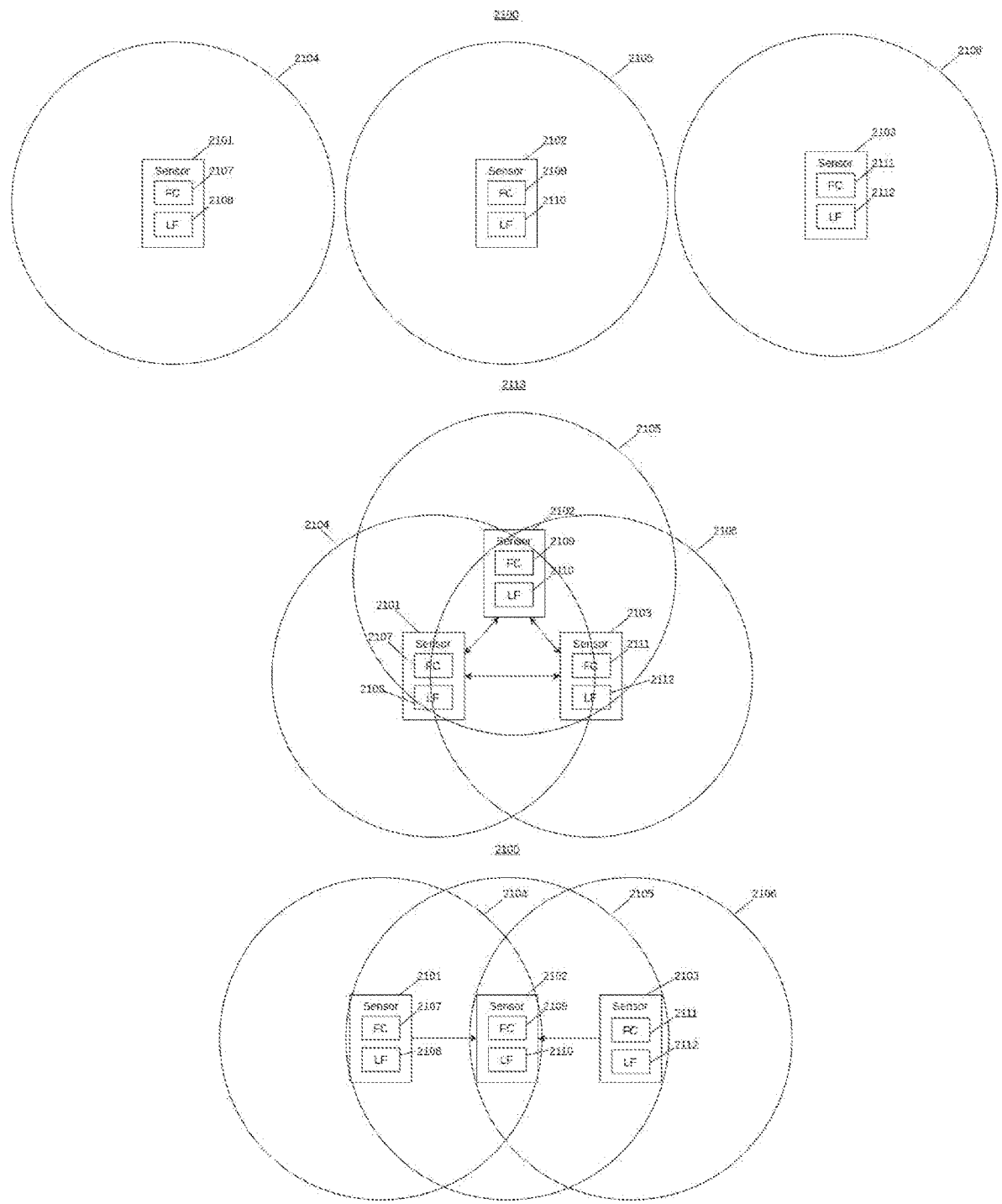
FIG. 21 Mobile sensor network extension

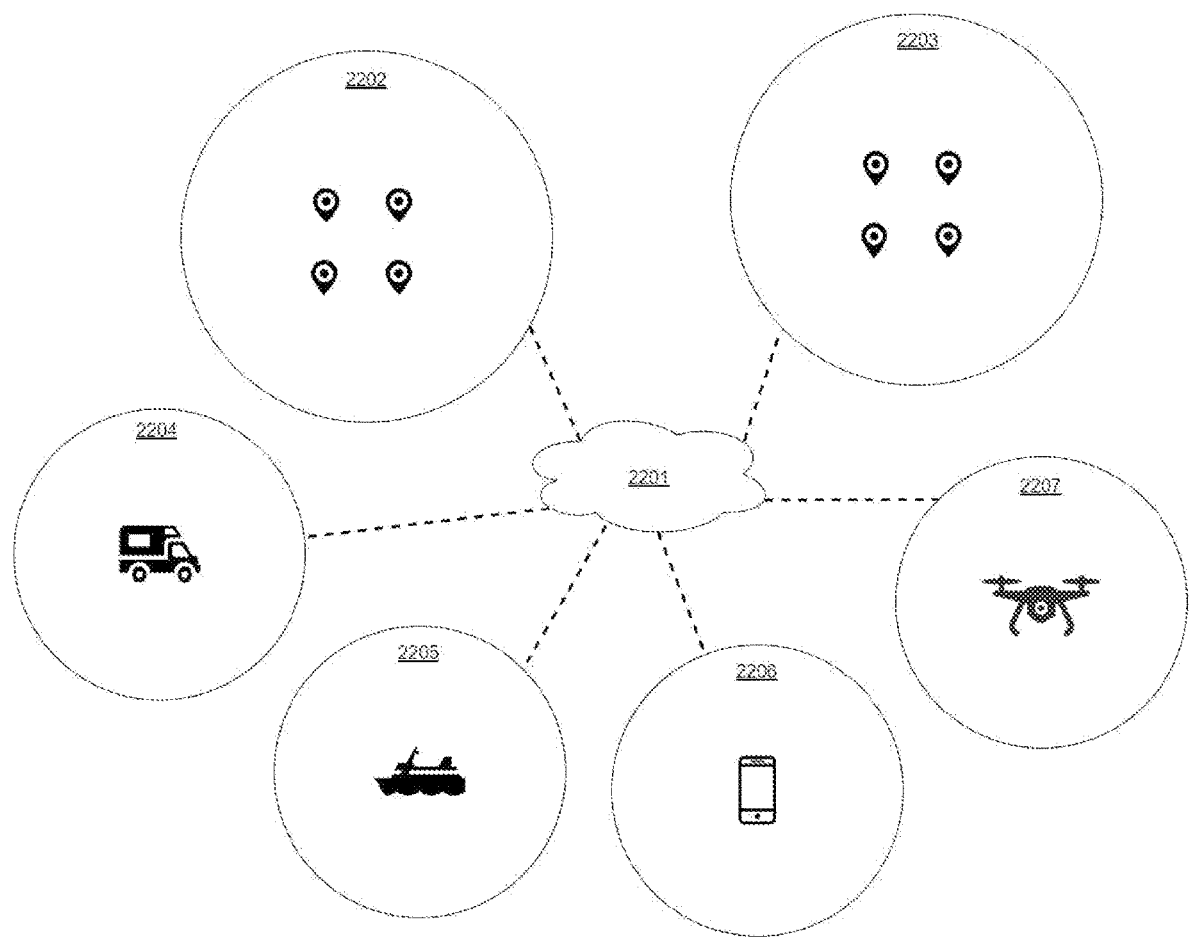
FIG. 22 Sensor Cloud

SENSOR NETWORK SYSTEM AND DEPLOYMENT FOR OBJECT DETECTION, TRACKING AND MITIGATION

CLAIM OF PRIORITY

This application claims priority to U.S. Application 63/038,756 filed on Jun. 13, 2020, the contents of which are herein fully incorporated by reference in its entirety.

FIELD OF THE EMBODIMENTS

The present invention and its embodiments relate to the design and modeling of distributed sensor networks for the monitoring, detecting, locating, and tracking of a signal, object, phenomenon, etc.

BACKGROUND OF THE EMBODIMENTS

Unmanned small vehicles including drones, remote controlled cars, and submarines are becoming a threat to public safety. For example, evidence shows that smugglers use drones to deliver contraband into correctional facilities, and frequently fly during the daytime because the drones are extremely hard to spot at high altitudes in daylight. At large public gatherings, hobbyists or amateurs playing with remote controlled cars or Unmanned Aerial Vehicles (UAVs) can easily cause panic which may result in calling the bomb squad to mitigate the threat.

Sensors using different technologies were designed in recent years to mitigate emerging threats such as the ones mentioned previously. These technologies are radar-based, Radio Frequency (RF)-based, Electric-Optic/Infrared (EO/IR)-based, acoustic-based, and so on. However, a sensor using a single technology has its limitations. For example, a radar-based sensor cannot detect a small drone at low altitude, an EO/IR-based sensor may have trouble differentiating between a bird and a bird-like drone. Most of these sensors can only detect a certain type of threat, and they cannot detect the operator of the threat. An RF sensor can address many of these limitations by sensing the active up-link and down-link signals between the controller and the drone of an Unmanned Aerial System (UAS), respectively. In order to detect radio-silent drones, a sensor using an RF module as the basic detection method can be enhanced by adding different modules like EO/IR or radar, and therefore be able to detect and mitigate most types of threats including unmanned aerial vehicles, Unmanned Surface Vehicles (USV), Unmanned Marine Vehicle (UMV) and Unmanned Ground Vehicles (UGV).

Even a well-equipped sensor can generate false alarms as a result of RF environment noise, interference, attenuation, and shadowing. A single sensor may also have trouble accurately locating and tracking a detected object. Therefore, multiple sensors are usually required to enhance the detection, location, and tracking capabilities. A sensor network is formed by multiple sensors that communicate with each other or with a server, which can collect and analyze the sensor data to overcome single-sensor deficiency issues. In order to optimize the detection, locating, and tracking performance of the sensor network, the sensor deployment models need to be designed for different environments and use cases. The present invention and its embodiments meet and exceed these needs.

SUMMARY OF THE EMBODIMENTS

The physical and functional design of a sensor for object detection is described. A sensor substantially comprises a platform, one or more processors, one or more transducers or instruments. In some respects, network devices may be required if one or more sensors are forming a sensor network. A module comprises one or more transducers or instruments and a processor. In some respects, a sensor may contain one or more modules that are interchangeable within the same platform. Preferred embodiments of a sensor using RF module(s) described herein relate to detecting and tracking an object that transmits RF signals.

A modular sensor design allows the sensor to monitor the surrounding environment, detect one or more objects when present in the monitoring zone, recognize, and extract features and information from the object, track multiple objects continuously or discretely, share data with other sensors or servers, store captured data for evidence, collect and process data from other sensors, capture intruder images or videos, mitigate the object's presence in its monitoring zone.

In order to improve the performance of a single sensor, a sensor network is used along with one or more higher logic that needs to be hosted on a server for post-processing the reports sent by the sensors in the network. In some respects, a local sensor network is established when the sensors use area networks like Local Area Network (LAN), Wireless Local Area Network (WLAN), Virtual Local Area Network (VLAN), and Mesh Network, or restricting sensor/server/user accessibility via Virtual Private Network (VPN) while having internet access.

In some respects, data within a local sensor network may be shared by using a network topology such as Star, Mesh, Tree, or Hybrid. A typical Star network model is comprised of multiple sensors and a single server which is described when the number of sensors is limited. A typical Mesh network model is comprised of multiple mobile sensors which can be used to enhance the mobility of the network. A typical Tree model is useful in order to create a load-balanced network when a large number of sensors is used, where multiple sensors and servers are grouped, and a higher-level server collects and processes the data from servers in the groups.

In some respects, sensors are preferred to have overlapping monitoring zones in a local sensor network with each other, the sensors can be stationary or mobile distributed. Local sensor networks can be in the form of stationary sensor distribution model, mobile sensor distribution model, hybrid sensor distribution model, remote sensor distribution model, time-based sensor distribution model, and 3D sensor distribution models.

A typical hybrid sensor distribution model is described. The model comprises a local sensor network formed by multiple stationary sensors, and a mobile sensor patrols the border and moves to the scene when an object is detected and located by the stationary sensors.

Typical directional sensor distribution models comprised of multiple sensors each offering a directional monitoring zone are described. In one aspect, sensors are facing different angles to cover a 360° area around the network's center. In another aspect, sensors are distributed in a line and face in one direction, where additional lines of sensors can be added in such a manner to cover a larger area.

A typical remote sensor distribution model comprised of multiple sensors using RF modules is described. Sensors are centralized in a sensor rack while remotely distribute their antennas using an RF over Fiber (RFOF) system.

A typical time-based sensor distribution model comprised of one or more mobile sensors is described. This model aims to provide location information or improve location accuracy when one or more sensors cannot accurately locate the object in the network.

A typical load-balanced sensor distribution model comprised of multiple randomly distributed sensors with limited power and network accessibility is described. Sensors are dynamically adjusting their positions, monitoring zones, active modules, and roles in the network in order to decrease the overall power consumption and extend the functional time of the sensor network.

Typical grid sensor distribution models comprised of multiple sensors following certain patterns are described. In one aspect, sensors are using a honeycomb pattern to reach the best coverage efficiency. In another aspect, sensors are using a square pattern for coverage overlaps and data redundancies. Such grid patterns can be applied to a 3D model that provides protection for a 3D space. In one aspect, such a model can be used in a smart city deployment, where the stationary sensors are distributed at different altitudes like street level and building rooftops while mobile sensors use different vehicle platforms such as a police car, a coast guard boat, and a drone.

In some respects, a local sensor network can merge with independent sensors or other local sensor networks to extend the monitoring zone. A typical stationary sensor network extension model comprised of a local sensor network formed with multiple stationary sensors and one or more independent mobile sensor(s) is described. The mobile sensor will be detected and registered under the local sensor network once it moves into the network monitoring zone, and accesses and shares sensing data within the network. A typical mobile sensor network extension model comprises multiple model sensors each acting as a single sensor network. A new network will be established when sensors connect to each other. In one aspect, each sensor collects data from the network and performs higher logic independently. In another aspect, a sensor is elected to become a server that collects data and performs a centralized higher logic.

A sensor cloud concept is introduced in the aspect of multiple local sensor networks with access to the cloud service. In some respects, an independent sensor(s) can also join the cloud, and merge into a local sensor network when entering the network's monitoring zone. The sensor cloud will further enhance performance for the local sensor networks by collecting data within the cloud, establishing cloud-based servers that analyze the data from local servers and sensors, influence the local sensor network(s) behavior, and create a load balancing pattern across multiple sensor networks. In some respects, a user can subscribe either from a local sensor network or the sensor cloud to access live and historical data, receive alerts and register personal devices as authorized objects.

BRIEF DESCRIPTION OF THE DRAWINGS

It will be appreciated that the illustrated boundaries of elements in the drawings represent only one example of the boundaries. One skilled in the art will appreciate that a single element may be designed as multiple elements or that multiple elements may be designed as a single element. An element shown as an internal feature may be implemented as an external feature and vice versa.

Further, in the accompanying drawings and description that follows, like parts are indicated throughout the drawings and description with the same reference numerals, respectively. The figures may not be drawn to scale and the proportions of certain parts have been exaggerated for convenience of illustration.

FIG. 1 is a diagram illustrating a physical design of an embodiment of a sensor of the present invention.

FIG. 2 is a diagram illustrating a sensor module of an embodiment of the present invention.

FIG. 3 is a diagram illustrating a preferred sensor embodiment of the present invention.

FIG. 4 is a diagram illustrating various sensor monitoring zones of the present invention.

FIG. 5 is a diagram illustrating adaptive monitoring zones of the present invention.

FIG. 6 is a diagram illustrating embodiments of a sensor network topology of the present invention.

FIG. 7 is a diagram illustrating a stationary sensor distribution model.

FIG. 8 is a diagram illustrating a second stationary sensor distribution model.

FIG. 9 is a diagram illustrating a mobile sensor distribution model.

FIG. 10 is a diagram illustrating a second mobile sensor distribution model.

FIG. 11 is a diagram illustrating a hybrid sensor distribution model.

FIG. 12 is a diagram illustrating a directional sensor distribution model.

FIG. 13 is a diagram illustrating a second directional sensor distribution model.

FIG. 14 is a diagram illustrating grid sensor distribution models.

FIG. 15 is a diagram illustrating a use case of grid sensor distribution model.

FIG. 16 is a diagram illustrating a remote sensor distribution model.

FIG. 17 is a diagram illustrating a three-dimensional (3D) sensor distribution model.

FIG. 18 is a diagram illustrating a use case of three-dimensional (3D) sensor distribution model.

FIG. 19 is a diagram illustrating a time-based sensor distribution model.

FIG. 20 is a diagram illustrating a stationary sensor network extension.

FIG. 21 is a diagram illustrating a mobile sensor network extension.

FIG. 22 is a diagram illustrating a sensor cloud of the present invention.

DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

The basic element in a sensor network system is the sensor that fulfills fundamental tasks like data collection and object detection. A sensor can collect data from surrounding environments such as Radio Frequency (RF) signals, acoustic signals, optical images, and infrared radiation, and measuring the environmental change to detect the presence of threat objects.

FIG. 1 shows examples of the physical sensor design 100, which substantially comprises a platform 103, one or more processors 104, and one or more transducers or instruments 105. In some circumstances, network devices 106 may be required if one or more sensors form a sensor network. Platform 103 is a container or enclosure that physically holds one or more elements of the sensor, including but not limited to box, backpack, ground vehicle, aircraft, marine vessel, UGV, UAV, USV, UMV, robot, handheld device, airdrop, mobile phone, satellite, or spaceship. Transducers include but are not limited to antenna and microphone. Instruments include but are not limited to camera and/or laser. Multiple transducers or instruments may be connected to the same processor or their different processors.

Physical sensor design 100 shows the transducers or instruments 105 located within the platform 103. In some respects, 101 transducers or instruments 105 may be remotely distributed outside of the platform 103. In latter case 101, media converters 107 may be required when the transducers or instruments are remotely distributed from the sensor platform, and/or includes devices like RFOF. In some respects, 102 wireless transceivers may be used as an alternative to a media converter. If the sensor was passive, the transceiver at the transducer/instrument side can be replaced with a wireless transmitter 109, the transceiver at the processor side can be replaced with a wireless receiver 108.

When one or more transducers or instruments are connected to a processor, they form a module. A sensor may contain one or more interchangeable modules within the same platform, and becomes extendable, allowing new modules to be added in order to fulfill the need to detect new objects. For instance, when a sensor with an RF module is set up to monitor the RF environment of an area and a radio silent threat presents, an EO/IR module can be added so the sensor will detect the threat once it captures any image of the threat.

FIG. 2 shows an example of a sensor 200 using RF module 201 as a basic module and extended with an EO/IR module 202. A Software Defined Radio (SDR) 206, an amplifier 207, an omni-directional antenna 208, and a processor 204 form an RF module 201. An EO camera 209, IR camera 210, and a processor 205 form an EO/IR module 202. Processor 205 is connected with processor 204 as a sub-processor and is monitored by processor 204. A network equipment 211 is connected to Processor 204 to provide network capability to the sensor 200. Some of the elements 204, 205, 206, 207, 211 are maintained within sensor platform 203, while the antenna 208 and cameras 209, 210 are outside of the platform 203.

Extra devices can be added to the sensor to extend and enhance its functionality. For example, a speedometer, a gyroscope, or a GPS device can be added to track the speed, orientation, or location of the sensor. A thermometer can be added inside of the platform to monitor the temperature of the internal components, help improve power efficiency and warn the operator when the sensor is overheating. An RF switcher can be added when there are multiple antennas and a single SDR, where the SDR can switch among antennas to sense in different frequencies or directions. An RF splitter can be added when there are multiple SDRs and a single antenna, therefore allowing multiple SDRs to function without having multiple antennas interfering with each other. Low-Noise Amplifiers (LNA) can also be added to enhance the sensing range of the sensor, or to compensate for the path loss between the antenna and SDR.

FIG. 3 shows examples of preferred sensor embodiment. Sensor 300 comprised of an enclosure 301, a processor 302, two SDRs 303, 304, a Wi-Fi/Bluetooth card 305, a GPS receiver 306, a four-way RF splitter 307, a Low Noise Amplifier (LNA) 308, an omni-directional antenna 309, a GPS antenna 310, a network equipment 211 and a network antenna 312. GPS antenna 310 is connected with GPS receiver 306 to provide sensor 300 GPS service. Omni-directional antenna 309, LNA 308, and splitter 307 are connected and split the incoming signal into four feeds into SDRs 303, 304, Wi-Fi/Bluetooth card 305, and therefore form an RF module. Network equipment 311 is connected with Processor 302 and network antenna 312 to provide a wireless network to the sensor 300.

An alternative sensor embodiment 313 in FIG. 3 comprises an enclosure 314, a processor 315, an SDR 316, an LNA 317, a four-way RF switcher 318, four directional antennas 319, 320, 321, 322, a network device 323, and a network antenna 324. The processor is connected with both SDR 316 and RF switcher 318 to select from one of the four antennas 319, 320, 321, and 322 and process the data from SDR 316. The network equipment 323 is connected with processor 315 and a network antenna 324 to provide a wireless network for the sensor 313.

FIG. 3 also shows a sensor embodiment 325 comprised of an enclosure 326, a network equipment 338, a network antenna 345, a GPS receiver 332, a GPS antenna 340, and two RF modules 346, 347 that was described for sensor embodiment 300 and 313. One RF module 346 is comprised of a processor 327, two SDRs 329, 330, a Wi-Fi/Bluetooth card 331, a four-way RF splitter 333, a LNA 334, an omni-directional antenna 339. Another RF module comprises a processor 328, an SDR 335, an LNA 336, a four-way RF switcher 337, and four directional antennas 341, 342, 343, 344. Processor 328 is connected to processor 327 as a sub-processor and mutually communicates with processor 327.

The sensor may be passive when it only collects and senses data from the environment. For example, a sensor uses an RF module and only scans the spectrum without any transmission or interference to the environment. A sensor can also be active as it interacts with the environment or the target object. For example, when a sensor uses an RF module and detects the presence of an object, it then transmits the signal to inject the command to the object and capture it. A sensor may monitor the environment of any N-dimensional space, include but not limited to any specific portion of the atmosphere, ground level, underground, underwater, water surface, and outer space. It can monitor the surrounding environment, detect one or more objects present in the monitoring zone, recognize and extract features and information from/about the object. The information of the object includes but is not limited to the manufacture, model, size, distance to the sensor, angle to the sensor, altitude, orientation, absolute speed, and relative speed to the sensor. A sensor can track multiple objects continuously or discretely, share data with other sensors or servers, store captured data for evidence, collect and process data from other sensors and capture intruder's images or videos. A sensor may also be able to mitigate the object present in its monitoring zone. The sensor processor collects raw data from the modules and performs data processing to deliver the described features with a software process called Local Fusion (LF).

The sensor has a finite monitoring zone, and its shape varies depending on the transducers or instruments that the sensor is using. As shown in FIG. 4, in 3D, the monitoring zone of sensor 400 can form a sphere 401, a toroid 402, a cone 403, and so on. In 2D, shown in FIG. 4, the sensor monitoring zone can form a circle 404, an annulus 405, a sector 406, and so on. A sphere 401 or circle 404 monitoring zone can be viewed as a special case of a cone 403 or sector 406 monitoring zone with a 360° angle, respectively. Alternatively, sphere 401 or circle 404 monitoring zone can be achieved by a sensor 400 with a cone 403 or sector 406 monitoring zone that rotates itself. A toroid 402 or annulus 405 zone can be viewed as a special case of a sphere 401 or circle 404 zone with a small radius of a blind area or an area with reduced performance around the sensor 400. A toroid 402 or annulus 405 monitoring zone can also be achieved by a sensor 400 with a cone 403 or sector 406 monitoring zone rotating itself in a horizontal plane for 360°.

The sensor monitoring zone may be adaptive to the environment or may be influenced by the objects in the environment, which include large objects like buildings, bridges, trees, and small objects like shields, walls, floors, plates, vehicles, or people. The monitoring zone may be dynamic in aspects including but not limited to a radius, angle, blind spot, or orientation. FIG. 5 shows examples of adaptive monitoring zones. A sensor 500 with a sector monitoring zone 503 may rotate itself 504 to form a circular zone 505 for a larger monitoring area. A sensor 501 frequently changes its monitoring radius 506 between minimum radius 507 and maximum radius 508 to adjust both detection sensitivity and false alarm rate. A sensor 502 with a circular monitoring zone 509 can reduce its angle to form a sector zone 511 to increase the accuracy for tracking object 510 movement.

In this application, a sensor is preferred, but not required, to have prior knowledge of its monitoring zone. In what follows, all 3D monitoring zones are represented by their 2D forms unless specified otherwise, furthermore, the circular zone is used as the default monitoring zone unless specified otherwise.

The sensors can use different networks to communicate, e.g. Ethernet, Wi-Fi, optic fiber, point-to-point wireless, LTE, and 5G. When the sensor network uses area networks like LAN, WLAN, VLAN, and Mesh Network, or restricting sensor/server/user accessibility via VPN while having Internet access, it becomes a local sensor network. For example, multiple sensors connected via Ethernet LAN within the same facility can form a local sensor network. If Multiple sensors use an LTE network and are restricted under the same VPN, they can also form a local sensor network. The local sensor network can also be established when sensors carrying mesh network devices connect with each other.

Within a local sensor network, data may be shared by using network topology include but not limited to Star, Mesh, Tree, or Hybrid. Sensors are preferred, but not required, to have overlapped monitoring zones. Sensors may have different shapes of monitoring zones, may use different sensor platforms, may use different network equipment, may use different modules, and may have a different distribution of their transducers or instruments.

Sensors share data within a sensor network, where a majority of the data will be collected, and higher logic may be performed to enhance the overall performance. The higher logic evaluates the sensors' post-processed data, takes sensor emplacement and the environment into consideration, and enhances the system performance such as increases detection probability, decreases false alarm rate, provides location and tracking for multiple objects, improves location accuracy, optimizes system response time, and predicts target behavior. The higher logic can also suggest, guide, and influence sensor behaviors, e.g. tuning monitoring zone, recommending specific direction for movement, changing sensor movement speed, and activating or deactivating the sensing module. The software that contains one or more of the higher logic described is called fusion center (FC).

The FC can be centralized or decentralized. When the FC is centralized, a FC is established at a server or a sensor. The FC collects post-processed data from the sensors' LF within the network, evaluates the data, and performs the higher logic. If the FC is decentralized, more than two FCs may be established among multiple sensors or servers. The FCs then collect data from the sensors' LF based on their locations or network availability, perform higher logic, and share the processed data with each other.

FIG. 6 shows examples of sensor network topology. A mesh sensor network 600 comprises multiple mobile sensors 603, 604, 605 carry mesh network devices. The mobile sensors interact and share data mutually when they connect with each other. Each sensor in the network maintains both a LF and FC. Each FC 606, 607, 608 collects data from the LFs of other sensors 609, 610, 611 in the network and performs higher logic independently. The data from the FCs 606, 607, 608 is then shared again among the multiple FCs 606, 607, 608 in the network. 601 is a typical star sensor network example. Multiple stationary sensors 613, 614, 615 connect via the Internet over a VPN, and server 612 using a centralized FC 616 to collect sensor data from LFs 617, 618, 619 and perform higher logic. 602 is a typical tree sensor network example. Sensors 625, 626, 627 reside in group A 620, a server 623 that holds a FC 631 collects data from LFs 633, 634, 635 and performs higher logic in group A 620. Another group is formed by server 624 and sensors 628, 629, 630, where FC 632 collects data from LFs 636, 637, 638 and performs higher logic. Another server 622 with a FC 639 is connected with server 623 and 624, and collect data from FCs 631, 632. Another layer of higher logic is performed by FC 639.

If a sensor had no prior knowledge of its location, it may locate itself within the sensor network. One method is pinging nearby sensors and measuring the time difference between packages sent and received, then the time differences can be converted to the distance between the sensors. The location of the sensor can be calculated using distance estimates from at least three nearby sensors.

Sensors may be stationary or mobile distributed within the local sensor network to reach the best performance. Many factors can influence the distribution of sensors in the network. The first thing to take into consideration is the physical environment. In rural areas, sensors are preferred to be deployed on taller buildings or structures widely spread throughout open areas to cover a larger area. In urban environments, sensors are preferred to be deployed at different altitudes with a higher density to compensate for the shadowing and fading issues caused by buildings. Environmental noise and interference considerations are also important factors in sensor deployment design. For RF sensors, RF interference and noises greatly affect the sensor detection probability and false alarm rate. Network and power availability plus network topology also affect the way sensors are deployed. For example, when deploying mobile sensors using a mesh network, sensors are preferred to stay within a certain range of each other to maintain a connection. Mobile sensors using the LTE network are preferred to stay in the area that has an LTE signal. Line of sight availability also plays an important role in sensor emplacement. For sensors using modules like EO/IR and radar, the presence of the object cannot be detected when the sensor has no line of sight to it. To overcome the lack of detection, one should measure the potential blind spot area and deploy other sensor modules like RF and increase the number of sensors.

In many cases, sensors are preferred to have overlapped monitoring zones, because the information redundancy collected from different sensors increases the location accuracy of the detected object and decreases the false alarm rate. Sensor data redundancy can also be used for locating an object when individual sensors in the sensor network lack the ability. For example, when multiple sensors equipped with RF modules and synchronized using GPS time detect the signal transmitted from an object, they capture part of the signal samples and send to the server, the server then uses cross correlation to evaluate the sample difference between each sensor, converts sample difference into time difference and further into distance difference, and eventually locates the object. Sensor deployment models in a local sensor network will be introduced in the following paragraph, with generic situation consideration, as the actual deployment will be influenced by the factors introduced in previous paragraphs.

A typical sensor distribution model may contain multiple fixed sensors installed around or within a facility 702, 705, as shown in FIG. 7. Sensors 703 are preferred to have overlapped monitoring zone 704 for better performance. Although the preferred minimum number of sensors is three (3), more sensors 703 can be added depending on the facility 702, 705 size and shape. The sensors 703 are preferred to form a convex shape to surround the total monitored area to cover the entire facility 702, 705 as well as substantial area outside the facility. This typical sensor distribution model offers protection both within and outside of the facility and offers continuous tracking when objects move into the monitored area.

FIG. 8 shows another typical sensor distribution model that contains multiple sensors that form a line or ring around a protected area 801 perimeter. Nearby sensors 802 may have overlapped monitoring zones 803 and the total monitoring zone covers the area 801 border. This sensor distribution model protects the border of the area 801, detects and tracks objects that move in or out of the monitored area.

One or more mobile sensors can form a local mobile sensor network, where both the network and its monitoring zones are dynamic. FIG. 9 shows a typical mobile sensor distribution model that contains multiple mobile sensors 903 to protect a VIP vehicle 904. Multiple sensors 903 may surround the VIP vehicle 904 with overlapped monitoring zones 905 to form a sensor network. In some environments like urban, two mobile sensors 903 are deployed in the front and back of the VIP vehicle 904, as shown in 901. In an open area, more sensors 903 can surround the VIP vehicle 904 to provide a larger monitoring zone, as shown in 902. In some cases, a portable sensor can be installed directly on the VIP vehicle 904 and make it a mobile sensor. The sensor network moves with the VIP vehicle 904 and preferably having the VIP vehicle 904 in the center of the monitoring zone 905. This model offers fast alerts when an object enters the monitoring zone 905 and provides a quick response time for both VIP vehicles 904 and sensors 903 to investigate and mitigate the object. The mobile sensors 903 also offer driver guidance to remain in a relative position for the selected transport formation.

FIG. 10 shows another typical mobile sensor distribution model that uses multiple mobile sensors 1005, 1006, 1007, 1008 in search of an object 1004 in an open area. Sensors 1005, 1006, 1007, 1008 have monitoring zone 1009, 1010, 1011, 1012, respectively. Mobile sensors 1005, 1006, 1007, 1008 forms a line or grid and move in one direction 1001. 1002 shows that after the first sensor 1007 detects the object 1004, other sensors 1005, 1006, 1008 start to move into the direction where the first sensor 1007 detected the object 1004. Sensors 1005, 1006, 1007, 1008 may recommend dynamic adjustments to their directions, distances between sensors, and speed to track the object 1004. Sensors 1005, 1006, 1007, 1008 shrink their encirclement until most of them can detect the object 1004 and can accurately locate it 1003. Sensors 1005, 1006, 1007, 1008 keep moving towards the object 1004 until one or more of them encounter the object 1004 and a retrieval or mitigation process may be conducted.

A hybrid sensor network utilizes mobile sensors to enhance stationary sensor performance. FIG. 11 shows a typical hybrid sensor distribution model example. In 1100, A sensor network comprised of multiple stationary sensors 1103, 1104, 1105, 1106 monitors an area 1108, and a mobile sensor 1107 patrols the area with a mobile monitoring zone 1109 outside of the area 1108. When the stationary sensor network detects an object 1102 and locates it in an area 1110, the sensor network sends an alert to the mobile sensor 1107 and guides it to the location area 1110 to search for the object 1102. In 1101, When the mobile sensor's monitoring zone 1109 detects the object 1102, the sensor network uses the mobile sensor 1107 data to enhance the location accuracy of the object 1102 and provided a smaller estimated area 1111. The mobile sensor 1107 can also retrieve the object 1102 or start the mitigation process when it encounters the object 1102. For example, if the object 1102 is detected and located in the controller signal of a UAS, the mobile sensor 1107 can move to the located controller area 1111 to arrest the pilot.

FIG. 12 shows a typical directional distribution model example comprises multiple sensors each offering a directional monitoring area. In 1201, sensors 1203 with monitoring zones 1204 face different angles to essentially form an omni-direction receiver. Sensors 1203 are distributed closely within the protected area 1205 to reduce blind spots between them. Sensors 1203 can also be distributed around the perimeter of the protected area 1205, increase their monitoring zones 1206 and offer protection from intruders from outside of the area, as shown in 1202.

An alternative version of the model 1201, 1202 distributes directional sensors in a straight line, as shown in FIG. 13. In 1301, sensors 1303 having directional monitoring zones 1304 are tuned to the same direction and formed a line of sensors 1305 to offer detection and tracking in that direction. Another line of sensors 1305 may be distributed behind the first line to cover its blind area. More lines of sensors 1305 can be distributed in such a manner and form a grid to cover a very large space, as shown in 1302.

FIG. 14 shows examples of grid sensor distribution model. A typical honeycomb pattern grid sensor distribution model uses a sensor and six adjacent sensors with a substantially uniform distance between each other, as shown in 1401. The sensors 1403 are preferred to have the least possible overlapped monitoring zones 1404 to achieve the maximum coverage area with the minimum blind spot. The network can be extended using such a pattern to cover larger areas or use a portion of it for small area protection. 1402 shows an alternative to the honeycomb pattern 1401, where the sensors' 1403 overlapped monitoring zones 1404 form a grid pattern. FIG. 15 is an example of using a grid model to cover street blocks 1501. Sensors 1502 may be installed on top of light poles or building corners at certain street intersections and prefer to have overlapped monitoring zones 1503 to minimize blind spots. This honeycomb grid model provides both ground level and airspace protection for the streets.

When sensors are airdropped into combat zones, they may be randomly distributed and have limited access to power and network. In cases like this, the balance between the coverage and power consumption of the sensor network greatly affects sensor distribution. Sensors can use mobile platforms to adjust their position for redistribution. Sensors can also dynamically decrease their monitoring zones to avoid complete overlapped monitoring zones with nearby sensors or increase their monitoring zones to cover blind spot areas. Sensors can be deactivated to preserve power and be reactivated when detection occurs from nearby sensors or when a nearby sensor runs out of power. Sensors can also be optimized for specific network features via techniques such as game theory or machine learning. An example includes but is not limited to using game theory to optimize the sensors to sporadically monitor individually to minimize power consumption and maximize detection speed and accuracy as a network. Sensors can further activate different modules. For example, some sensors activate RF modules while others activate EO/IR modules and some sensors only act as servers for data collection and processing or as relays to connect nearby sensors.

Sensors can remotely distribute their transducers or instruments while having themselves centralized in one place, or even in one platform. In such a case, sensors are more easily accessed, monitored, and maintained. Sensor transducers or instruments can utilize one of the distribution models introduced in this application. FIG. 16 shows multiple sensors 1601, 1602, 1603, 1604 using RF modules centralized in a sensor rack 1600 while remotely distributing their antennas 1613, 1614, 1615, 1616 using an RFOF system. Antennas 1613, 1614, 1615, 1616 are connected to RFOF transmitters 1609, 1610, 1611, 1612 via coax cables 1618. RF signals received by antennas 1613, 1614, 1615, 1616 are converted into optic signals, amplified, and sent to RFOF receivers 1605, 1606, 1607, 1608 via optical fibers 1617. RFOF receivers 1605, 1606, 1607, 1608 convert the optic signals back to RF signals and feed them into the sensors 1601, 1602, 1603, 1604. This allows the antennas 1613, 1614, 1615, 1616 to be distributed miles away from the sensor rack 1600 without significant loss of signal power.

3D sensor distribution models can be utilized when it is needed to take the vertical plane into consideration. FIG. 17 shows a typical 3D grid distribution example, where multiple layers of sensor grids 1701, 1702, 1703 with different altitudes form a sensor matrix. When the sensors use platforms such as submarines or underwater drones, this model creates a 3D monitoring space underwater. When the sensors use UAS then the 3D sensor distribution model can be applied to airspace protection.

Another typical 3D sensor distribution model is smart city distribution, as shown in FIG. 18. Stationary sensors can be installed on streetlights 1801 for street-level monitoring, on top of buildings 1802, 1803, 1804 for airspace monitoring, and at different altitudes to provide larger monitoring spaces in complex environments. Mobile Sensors can be placed on ground vehicle 1805, boat 1806, aircraft 1807, and drones 1808 to provide dynamic protection. Sensors may even use platforms like cellphone 1809 and robotic canine 1810 to provide coverage inside buildings. A hybrid network topology that utilizes both Tree and Mesh Network models can be used in such situations to allow distributed network computation for better system efficiency.

When considering time in the previous models, a sensor network may use fewer sensors to achieve comparable performance. For example, in FIG. 19, a mobile sensor 1901 using an RF module with a monitoring zone 1903 estimates the distance between the sensor 1901 and the object 1902 based on Received Signal Strength (RSS). The mobile sensor 1901 moves to different relative locations A, B, C to the object at different time a, b, c and takes readings x, y, z of signal transmitted from the object 1902. With the sensor location information A, B, C, detection time a, b, c, and distance estimation from RSS readings x, y, z, the location of the object 1902 can be calculated using a single mobile sensor 1901. Such a model also applies when the sensor 1901 measures the Direction of Arrival (DOA) of the signal transmitted from the object. When the object is in a moving status, the mobile sensor needs to move at the same or higher speed to keep the object within its monitoring zone.

A local stationary sensor network can extend its monitoring zones by merging with independent sensors or other local sensor networks. For example, a local sensor network detects an independent mobile sensor entering its monitoring zone. After verifying and identifying the sensor, the local sensor network registers the sensor and merges it into the network. In another case, the independent sensor sends a request to join the network when it detects a local sensor network, then the sensor network registers and merges the new sensor into the network. The sensor network may drop a sensor from its network if the sensor leaves the area or loses connection to the stationary sensor network. After merging, the sensor network can utilize the data shared from the independent sensor or other sensor networks for performance enhancement.

FIG. 20 shows a typical example of stationary sensor network extension. In 2000, multiple stationary sensors 2004, 2005, 2006, and a server 2003 form a local sensor network and monitor an area 2011. An independent mobile sensor 2013 with a monitoring zone 2017 approaches 2016 the stationary sensor network from outside the protected area 2011. The server in the stationary network has an FC 2007 that collects reports 2012 from LFs 2008, 2009, 2010 of sensors 2004, 2005, 2006 in the network. The independent mobile sensor 2013 has an FC 2014 that collects reports from the LF 2015 of the sensor 2013. As shown in 2001, once the mobile sensor 2013 enters the area 2011, the server 2003 detects the sensor 2013 and registers it 2013 into the local sensor network. The mobile sensor 2013 shares its data 2018 with the stationary sensor network FC 2017 which shares its data 2019 with the mobile sensor FC 2014. The mobile sensor 2013 may continue to patrol and share data with the stationary sensor network server 2003 until it leaves its monitoring zone 2011. In 2002, when the mobile sensor 2013 leaves 2020 the area 2011, the stationary sensor network server 2003 drops the mobile sensor 2013 from the network and the mobile sensor 2013 becomes an independent sensor again. With strategic stationary sensor placement, this model may be used to escort a VIP vehicle from a certain place to a protected area and provide continuous protection during the escort process and after. This model may also be used for routine patrols of one or more mobile sensors among multiple stationary local sensor networks.

FIG. 21 shows a typical mobile sensor network extension example where multiple mobile sensors 2101, 2102, 2103 operate independently, each with a LF 2108, 2110, 2112, and FC 2107, 2109, 2111, respectively. In 2100, each mobile sensor 2101, 2102, 2103 can be viewed as a single sensor network with a mobile monitoring zone 2104, 2105, 2106. 2113 shows that when the sensors 2101, 2102, 2103 move closer and detect the presence of other sensors, they establish a new sensor network and share data with each other. FCs 2107, 2109, 2111 on sensors 2101, 2102, 2103 still perform independently as each one of them collects reports from LFs 2108, 2110, 2112 and performs higher logic. 2100 shows an alternative case of 2113, as the sensors 2101, 2102, 2103 vote for one mobile sensor 2102 to maintain an active FC 2109, deactivate the other FCs 2107, 2111, where FC 2109 collects reports from LFs 2108, 2110, 2112 and perform higher logic. A sensor will drop from the network and become independent again when it leaves and no longer detects other sensors. This model may be used when temporary protection is required for a crime scene, a special event, or escorting a VIP. Instead of setting up a stationary sensor network, an order can be given to nearby mobile sensors. These sensors may be patrolling or on-call before the order was sent. Then sensors may move to the target area and quickly establish a temporary and mobile sensor network, providing detection, alert, and mitigation for threats in the target area.

Multiple local sensor networks can form a sensor cloud when they are granted access to the cloud service, as shown in FIG. 22. Independent sensors using different sensor platforms 2204, 2205, 2206, 2207 can also join the cloud 2201 and still merge into a local sensor network 2202, 2203 when they enter the local network monitoring zone. The sensor cloud 2201 establishes cloud-based servers to collect data from multiple sensor networks 2202, 2203, 2204, 2205, 2206, 2207, analyzes the report from local servers and sensors, and further influences local sensor networks' behavior. The cloud service also allows local sensor networks to share their data with selected other local networks and authorized users. The sensor cloud 2201 also balances resources among sensor networks. For example, when one sensor network 2202 experiences massive drone attacks, such as from a swarm, and the local server strains under great pressure to rapidly process the data and can offload the burden to other local servers 2203 in the sensor cloud where there is less activity in those local sensor networks.

A local sensor network allows users to subscribe to it via local network or cloud service using various authenticated devices such as cellphone, laptop, controller, and drone. Subscription provides a number of user features, including the ability to send alerts to the user, provide a User Interface (UI) for visualization of real-time and historical detection/tracking data, receive user requests to register user-controlled objects like UAS and vehicles, track, and alert on user registered objects.

What is claimed is:

1. A sensing system for use outdoors, the sensing system comprising:
   sensors
      wherein the sensors comprise:
         a platform;
         one or more processors;
         one or more transducers or instruments,
            wherein the one or more transducers or instruments connect with
            one of the one or more processors to form a module, wherein the sensors comprise at least one mobile sensor, wherein
            the sensors are configured to sense the RF environment, detect the presence of the RF signal transmitted from an object, extract physical characteristics of the RF signal, and extract information contained in the RF signal, and wherein the extracted information includes manufacture, model, size, distance to the sensor, angle to the sensor, altitude, orientation, absolute speed, relative speed to the sensor, and broadcast information from the object.

2. The sensing system of claim 1 further comprising network devices when the sensors form a sensor network.

3. The sensing system of claim 1 wherein the sensors employ an RF module, and contain one or more modules that are interchangeable within the platform.

4. The sensing system of claim 1 wherein the sensors comprise: an omni-directional antenna, a GPS antenna, an antenna for network device, an LNA, a four-way RF splitter, two SDRs, a Wi-Pi module, a GPS receiver, a processor, and an enclosure, or any combination thereof.

5. The sensing system of claim 1 wherein the sensors comprise: four directional antennas, one network antenna, an LNA, a four-way RF switcher, one SDR, a processor, and an enclosure, or any combination thereof.

6. The sensing system of claim 1 wherein the sensors are configured to monitor a surrounding environment, detect one or more objects when present in the monitoring zone, extract feature and information from the detected object, track multiple objects continuously or discretely, share data with other sensors or servers, store captured information or raw data for evidence, collect and process data from other sensors, capture intruder images or videos, mitigate the object present in its monitoring zone.

7. The sensing system of claim 1 wherein the sensors utilize local fusion to collect raw data from the modules and perform data processing.

8. The sensing system of claim 1 wherein the one or more sensors have overlapping monitoring zones in a local sensor network and wherein the one or more sensors are stationary or mobile.

9. The sensing system of claim 1 wherein the one or more sensors comprise a plurality of stationary sensors and mobile sensors, wherein the plurality of stationary sensors are configured to provide an alert to the mobile sensors.

10. The sensing system of claim 1 wherein the one or more sensors function as a singular sensor sharing information between the one or more sensors while designating one or the one or more sensors as a primary sensor.

11. The sensing system of claim 1, wherein the at least one mobile sensor patrols a border and moves towards a detected object when located by multiple stationary sensors.

12. The sensing system of claim 1, wherein the sensing system comprises multiple mobile sensors.

13. A sensor network comprising:
   one or more sensors; and
   one or more servers, and
   wherein the sensor network operates as a local sensor network when it uses area networks like Local Area Network (LAN), Wireless Local Area Network (WLAN), Virtual Local Area Network (VLAN) and Mesh Network, or restricting sensor/server/user accessibility via Virtual Private Network (VPN) while having Internet access wherein data may be shared by using network topology protocols of a Star network, Mesh network, Tree network, or Hybrid network, or any combination thereof,
   and wherein the mesh network comprises mobile sensors carrying mesh network devices with each sensor in the network containing a fusion center that collects data from the local fusions of sensors in the network and performs higher logic independently, and the data from the fusion center is then shared again across multiple fusion centers in the network or wherein the tree network comprises multiple sensors and servers with the multiple sensors put into different groups, and each group has a server that collects data and performs higher logic, and another server that collects data and performs higher logic from the servers in groups.

14. The sensor network of claim 13 further comprising one or more fusion center(s) configured to collect the data from sensors and perform higher logic to enhance the overall performance.

15. The sensor network of claim 14 wherein the fusion center is centralized in a server or a sensor.

16. The sensor network of claim 14 wherein the fusion center is decentralized among multiple servers and sensors.

17. The sensor network of claim 13, wherein the local sensor network allows other singular sensors or local sensor networks to join and leave the network.

\* \* \* \* \*